(12) United States Patent
Nummila et al.

(10) Patent No.: US 9,202,093 B2
(45) Date of Patent: Dec. 1, 2015

(54) METHODS FOR ENHANCING THE ACCURACY OF ENVIRONMENT MEASUREMENTS USING A REMOTE-ACCESS APPARATUS

(75) Inventors: Kaj Nummila, Espoo (FI); Kaarle Jaakkola, Helsinki (FI); Miika Huusko, Helsinki (FI); Heikki Seppä, Helsinki (FI); Juhani Virtanen, Tampere (FI); Juha Vattulainen, Kangasala (FI)

(73) Assignee: SMARTRAC IP B.V., Amsterdam (NL)

( * ) Notice: Subject to any disclaimer, the term of this patent is extended or adjusted under 35 U.S.C. 154(b) by 241 days.

(21) Appl. No.: 13/880,918

(22) PCT Filed: May 4, 2011

(86) PCT No.: PCT/FI2011/050412
§ 371 (c)(1),
(2), (4) Date: Jun. 26, 2013

(87) PCT Pub. No.: WO2012/052607
PCT Pub. Date: Apr. 26, 2012

(65) Prior Publication Data
US 2013/0265139 A1 Oct. 10, 2013

(30) Foreign Application Priority Data

Oct. 22, 2010 (WO) .................. PCT/FI2010/050836
Jan. 12, 2011 (WO) .................. PCT/FI2011/050015
Jan. 12, 2011 (WO) .................. PCT/FI2011/050020

(51) Int. Cl.
*H04Q 5/22* (2006.01)
*G05B 19/00* (2006.01)
(Continued)

(52) U.S. Cl.
CPC ............ *G06K 7/10366* (2013.01); *G01K 1/024* (2013.01); *G01K 7/32* (2013.01); *G06K 7/0008* (2013.01); *G06K 19/0716* (2013.01); *G06K 19/0717* (2013.01); *Y10T 29/49018* (2015.01)

(58) Field of Classification Search
CPC ............ G06K 7/0008; G06K 19/0723; G06K 19/07749; G06K 19/0716; G06K 19/0707; G06K 19/0712; G06K 19/0726; G06K 19/07758; G06K 2017/0051; G06K 7/10059; G06K 19/0701; G06K 17/00; G06K 19/0713; G06K 19/0717; G06K 19/0728; G06K 19/07767; G06K 7/10009; G06K 7/10039; G06K 7/10069; G06K 7/10079; G06K 7/10108; G06K 7/10297; G06K 7/10356; G06K 7/10366; G06K 19/07764; G06K 7/0095; H01Q 1/2225; H01Q 1/22; H01Q 1/2216; G01D 3/022
USPC .......... 340/10.1, 5.82, 539.1, 539.21, 539.22, 340/539.26, 572.1, 572.2
See application file for complete search history.

(56) References Cited

U.S. PATENT DOCUMENTS 7,474,230 B2 * 1/2009 Blom et al. .............. 340/870.04
7,859,387 B2 * 12/2010 Friedrich ..................... 340/10.1
(Continued)

FOREIGN PATENT DOCUMENTS

GB 2308947 A 7/1997
GB 2464734 A 4/2010
(Continued)

OTHER PUBLICATIONS

PCT/ISA/210—International Search Report—Aug. 12, 2011 (Issued in PCT/FI2011/050412).
(Continued)

*Primary Examiner* — Jennifer Mehmood
*Assistant Examiner* — Emily C Terrell
(74) *Attorney, Agent, or Firm* — Venable LLP; Eric J. Franklin

(57) ABSTRACT

A method for determining a value of an environment variable using raw data from an energetically essentially passive remote-access apparatus. A value of a first measurable quantity indicative of the environment variable is obtained from the raw data. The value of the environment variable is determined using calibration data and the value of the first measurable quantity. The accuracy is enhanced by measuring the value of the measurable quantity with a measuring signal of which strength is regulated or by obtaining a value of a second measurable quantity. The second measurable quantity is indicative of the environment variable or measurement conditions of the first measurable quantity. A method for forming calibration data for the measurements. RFID reader devices arranged to carry out the methods and energetically essentially passive remote-access apparatuses for the methods. A database that may be used with the method and a computer product including the database.

15 Claims, 9 Drawing Sheets

(51) Int. Cl.
  *G08B 1/08* (2006.01)
  *G08B 1/00* (2006.01)
  *G08B 13/14* (2006.01)
  *G08B 23/00* (2006.01)
  *G06K 7/10* (2006.01)
  *G01K 1/02* (2006.01)
  *G01K 7/32* (2006.01)
  *G06K 7/00* (2006.01)
  *G06K 19/07* (2006.01)

(56) References Cited

U.S. PATENT DOCUMENTS

| | | | |
|---|---|---|---|
| 2001/0004236 A1* | 6/2001 | Letkomiller et al. | 340/572.1 |
| 2004/0036626 A1 | 2/2004 | Chan et al. | |
| 2004/0153270 A1 | 8/2004 | Yamashita et al. | |
| 2005/0055237 A1 | 3/2005 | Schmidtberg et al. | |
| 2005/0276307 A1 | 12/2005 | Song et al. | |
| 2006/0106561 A1 | 5/2006 | Thiesen | |
| 2006/0202821 A1 | 9/2006 | Cohen | |
| 2006/0261946 A1 | 11/2006 | Himberger et al. | |
| 2007/0069875 A1* | 3/2007 | Doi | 340/440 |
| 2007/0222590 A1 | 9/2007 | Posamentier | |
| 2009/0278685 A1 | 11/2009 | Potyrailo et al. | |
| 2010/0097194 A1 | 4/2010 | Killian et al. | |
| 2010/0134257 A1 | 6/2010 | Puleston et al. | |

FOREIGN PATENT DOCUMENTS

| | | |
|---|---|---|
| JP | 2004-144683 | 5/2004 |
| JP | 2007111137 A | 5/2007 |
| WO | WO-00/50849 A1 | 8/2000 |
| WO | WO-03098175 A1 | 11/2003 |
| WO | WO-2008/035151 A2 | 3/2008 |
| WO | WO-2009/138893 A1 | 11/2009 |

OTHER PUBLICATIONS

PCT/ISA/237—Written Opinion of the International Seraching Authority—Aug. 12, 2011 (Issued in PCT/FI2011/050412).
PCT/ISA/210—International Search Report—Jun. 29, 2011 (Issued in PCT/FI2010/050836).
PCT/ISA/237—Written Opinion of the International Searching Authority—Jun. 29, 2011 (Issued in PCT/FI2010/050836).
PCT/IPEA/409—International Preliminary Report on Patentability—Jan. 9, 2013 (Issued in PCT/FI2010/050836).
PCT/ISA/210—International Search Report—Sep. 12, 2011 (Issued in PCT/FI2011/050020).
PCT/ISA/237—Written Opinion of the International Searching Authority—Sep. 12, 2011 (Issued in PCT/FI2011/050020).
PCT/ISA/210—International Search Report—Aug. 18, 2011 (Issued in PCT/FI2011/050015).
PCT/ISA/237—Written Opinion of the International Searching Authority—Aug. 18, 2011 (Issued in PCT/FI2011/050015).
PCT/IPEA/409—International Preliminary Report on Patentability—Feb. 1, 2013 (Issued in PCT/FI2011/050015).

* cited by examiner

METHODS FOR ENHANCING THE ACCURACY OF ENVIRONMENT MEASUREMENTS USING A REMOTE-ACCESS APPARATUS

CROSS-REFERENCE TO RELATED APPLICATIONS

This application claims priority to PCT/FI2010/050836 filed 22 Oct. 2010, PCT/FI2011/050020 filed 12 Jan. 2011, and PCT/FI 2011/0500015 filed 12 Jan. 2011 and is the national phase under 35 U.S.C. §371 of PCT/FI2011/050412 filed 4 May 2011.

FIELD OF THE INVENTION

The present invention relates to measuring environment with energetically passive remote-access apparatuses, especially to methods, devices and systems for enhancing the accuracy of the measurements. The invention relates also to calibration of the remote-access apparatuses for measurement purposes and devices and systems calibration.

BACKGROUND OF THE INVENTION

Modern logistics was to a great degree enabled by the development of the product code system and bar codes. Products and pallets could be quickly identified by reading a bar code with an optical reader, and the tracking of items in the logistic chain became feasible. Furthermore, the products could be counted and sold at the point of sale more quickly and more reliably. Beyond consumer product logistics, industrial material management systems, postal and courier services, healthcare and bio-analytics systems and many other fields of human activity have benefited from the use of bar codes.

Over time, the needs of having various kinds of information available on a product outgrew the capabilities of a simple bar code. To this end, new technologies were developed, such as two-dimensional bar codes. Of such technologies, radio frequency identification (RFID) has rather quickly become the technology of choice for identifying and tracking items. RFID technology has a vast number of applications making use of the ability to read an RFID tag from a distance even without a line-of-sight connection between the reader and the tag. RFID is quickly replacing or at least augmenting the bar code technology in many places.

The basic information that an RFID tag carried has traditionally been electronic product code (EPC) information and/or tag identification information. RFID tags with more capabilities may have the ability to store more information in the tag memory, and even carry out some simpler processing of data.

A radio frequency identification tag (RFID tag) typically comprises an RFID chip and an antenna connected to the chip, attached to or protected inside a plastic layer. The RFID chip contains analog and/or digital processing circuitry, e.g. a state machine and/or a processor and memory for storing information, as well as circuitry for receiving radio frequency (RF) energy and modulating the RF wave. The chip is connected to the antenna, whose shape and size depend on the frequency at which the tag operates and the application for which the tag is used. The chip and the antenna are often laid inside a thin plastic container for protection. The tag as a whole is typically flexible to a certain degree, especially the passive tags that do not contain a power supply.

Passive tags use the energy from the radio-frequency electromagnetic field of the read-out signal to power the operations that the tag carries out. Passive tags operate essentially while they are in the reader field, and are essentially inactive at other times. Therefore, the farther the reader device and the weaker the read-out signal, the less energy is available for the tag to use. This in turn means that the tag cannot perform very complex operations that would require a lot of power, since such tags could only be read from a very short distance away. In other words, the read-out distance of a tag is to a large extent determined by the power consumption requirements of the tag. Naturally, the attenuation and power distribution of the electromagnetic signal emitted by the tag is another concern. To tackle this issue, some passive tags have a battery that may be used to power the processing circuitry and thereby allow longer operating range for the tag. Such tags that use an internal power source to energize the response signal may be called semi-passive tags.

Some applications may necessitate more complex processing and/or more demanding properties of the RFID tag. It may become necessary to arrange more internal power such that these operations may be carried out. Some tags may require an internal power source to communicate with a longer range. Such tags may be called active tags. It may also be necessary to provide internal power so that operations can be carried out at times when the power from the external radio frequency electromagnetic field is not available. Usually this is arranged by means of a battery attached to the RFID tag. The battery may power sensors, memory, processors and/or a transmitter of the tag so that sensing, data logging and processing may be carried out at any time. Such more complex tags may be more complicated to manufacture, more expensive and/or more prone to malfunction than passive or semi-passive tags. Moreover, any tags with an internal power supply may have a limited lifetime, since they cannot be operated properly or at all when the battery runs out. Another practical problem is that when an active tag is taken into use, the battery operation needs to be activated. Otherwise, the battery would be in use e.g. already starting from manufacturing of the tag and prior to actual active use.

An example of demanding properties of a tag are measurements. In some applications, wireless measurements regarding the environment may help process or quality control. Active tags are often larger and more expensive than passive tags. Furthermore, in some applications, particularly related to construction engineering, the battery of the active tag may be difficult to change. Therefore, e.g. for process or quality control, passive tags capable of measurements are needed.

SUMMARY OF THE INVENTION

Now there has been invented an improved and more accurate method to determine the value of an environment variable using an energetically essentially passive remote-access apparatus and raw data. The method comprises obtaining a value ($f'_{osc}$, TRcal0', $\Delta f'_{LF}$, S', NC') of a first measurable quantity from the raw data, the first measurable quantity being indicative of the environment variable, and determining the value of the environment variable using calibration data, and the value of the first measurable quantity. In the method the accuracy is enhanced by measuring the value of the measurable quantity with a measuring signal of which strength is regulated or by obtaining a value (TRcal0', $\Delta f'_{LF}$, $f'_{osc}$, $f'_{LF}$, P') of a second measurable quantity, the second measurable quantity being indicative of the environment variable or the measurement conditions of the first measurable quantity. In the method, the raw data may be measured from the remote-access apparatus.

In one embodiment a signal strength indicator is used to enhance the accuracy of measurements. In one embodiment, a regulated signal strength is used in the measurements to remove the dependence of measurement results on the signal strength. In one embodiment, the signal strength is regulated only to some degree, and the signal strength indicator is used to further enhance the accuracy of the measurements. In another embodiment, at least two different quantities are measured to determine the value of an environment variable. In an embodiment, a value of a TRcal0 parameter is used to increase the accuracy based on measuring a local frequency. In one embodiment, the frequency, the TRcal0 value and the signal strength indicator are all used to enhance accuracy.

In relation to the method, a method for calibrating a remote-access apparatus has been invented. The method comprises measuring a value ($f_{osc}$, TRcal0', $\Delta f_{LF}$, S', NC') of a first measurable quantity indicative of an environment variable ($T'_i$) in measurement conditions, measuring a value of said environment variable ($T'_i$) corresponding to said measured value of a first measurable quantity and measurement conditions, and forming calibration data for said remote-access apparatus using said value ($f_{osc}$, TRcal0', $\Delta f_{LF}$, S', NC') of a first measurable quantity and said value ($T'_i$) of said environment variable. In the method, the accuracy of calibration is enhanced by regulating the strength of a measuring signal or by measuring a value (TRcal0', $\Delta f_{LF}$, $f_{osc}$, $f_{LF}$, P') of a second measurable quantity, the second measurable quantity being indicative of the environment variable or the measurement conditions.

In relation to these methods, RFID reader devices arranged to carry out the methods are presented and energetically essentially passive remote-access apparatuses suitable for the methods are also presented. Finally, a database that may be used in connection with the method, and a computer product comprising the database are presented.

Various aspects of the invention include a method, an apparatus, a server, a client and a computer readable medium comprising a database stored therein, which are characterized by what is stated in the in examples. Various embodiments of the invention are disclosed in the examples.

DESCRIPTION OF THE DRAWINGS

In the following, various embodiments of the invention will be described in more detail with reference to the appended drawings, in which FIG. 4a shows the dependence between the temperature and the clock frequency in a typical remote-access apparatus.

DETAILED DESCRIPTION OF THE EMBODIMENTS

In the following, several embodiments of the invention will be described in the context of radio frequency identification (RFID) tags. It is to be noted, however, that the invention is not limited to RFID tags and systems only. In fact, the different embodiments have applications widely in any environment where advanced functionalities and memory capabilities of small devices with limited power supply are needed.

It has been noticed in the context of this invention that certain advanced applications of RFID tags would require active RFID tags (such tags that have a power supply), and that this would in turn make the tags more complicated and more expensive. Alternatively, straightforward implementation of advanced functionality on passive RFID tags would increase the power consumption of the tags and thereby reduce the effective reading range or operational range of the tag. Various embodiments of the invention are envisioned to be used with RFID tags that are energetically essentially passive, that is, with tags that operate essentially while being in the reader field and being able to draw energy from the field.

In various embodiments of the invention, some of the processing required by the advanced functionality of a passive RFID tag may be carried out in the reader device or elsewhere in the system. This makes it possible to reduce the power consumption of the RFID tag and for the tag to have an improved operational range. The invention may help to keep the tag electronics simple and thus usable in weaker reader fields and/or longer reading ranges. On the other hand the invention may also reduce need for powerful readers to compensate for the tag power consumption. The latter benefit may be significant in some environments with many readers in the same area and/or where interfering electromagnetic fields need to be kept to a minimum.

In the invention, it has been noticed that simple and passive tags and other devices may not be equipped with memory for storing data, for example for utilizing advanced functionality of a tag. In addition, it has been noticed that there may arise needs for protecting some of the data from unauthorized access, and that providing such mechanisms may be difficult to implement, energetically expensive (leading to disadvantages mentioned above), and/or such that they lead to solutions that are specific to a tag type or a tag manufacturer, thus making it more difficult to employ such tags more widely. All and any one of these problems have been identified in the context of this invention.

Figure 1:
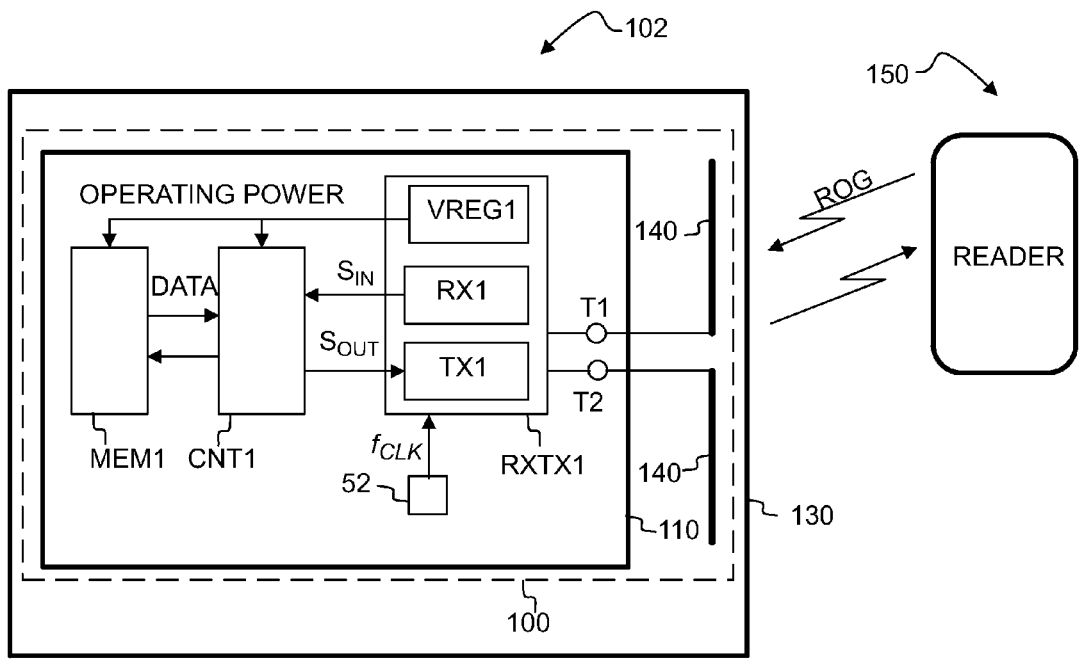
FIG. 1 shows a reader and a transponder.

FIG. 1 shows an example of an RFID tag 102 and an RFID reader device 150. The RFID tag comprises an RFID inlay 100 and a substrate 130. Furthermore, the RFID inlay comprises an RFID chip 110 and an antenna 140. The chip 110 may comprise a radio frequency unit RXTX1, a control unit CNT1, and a memory MEM1. The radio frequency unit RXTX1 may comprise a signal receiver RX1, and a signal transmitter TX1. The radio frequency unit RXTX1 may comprise connection terminals T1, T2, which may be connected to at least one antenna element 140. The antenna elements may from e.g. a dipole antenna or an inductive antenna (coil antenna). The radio frequency unit may send signals $S_{IN}$ to the control unit and receive signals $S_{OUT}$ from the control unit. The control unit may receive data DATA from the memory, and write data into the memory. The radio frequency unit RXTX1 may comprise a voltage supply VREG1, which is arranged to extract operating power from an incoming radio frequency signal.

Both the control unit and the memory may receive their operating power from the voltage supply. Therefore, the tag may be essentially passive, i.e. it does not comprise an energy source. Moreover, the RFID chip 110 comprises an oscillator 52 to produce a clock frequency $f_{CLK}$ for the radio frequency unit. The clock frequency may depend on the frequency of the local oscillator f.

The transponder may be substantially passive, i.e. energy for operating the radio frequency unit RXTX1, the control unit CNT1, the local oscillator 52, and the memory MEM1 may be extracted from a radio frequency field. Energy for operating the radio frequency unit RXTX1, the control unit CNT1, the local oscillator 52, and the memory MEM1 may be extracted an interrogation signals ROG sent from a readers.

A passive transponder 100 may comprise a capacitor or a rechargeable battery for storing operating energy extracted from an interrogation signal. Operating energy for operating the radio frequency unit RXTX1, the control unit CNT1, the local oscillator 52, and the memory MEM1 may be extracted from one or more interrogation signals sent from one or more readers.

The local oscillator 52 may be used to measure a value of an environment variable, such as temperature, when the frequency of the local oscillator depends on this variable. In addition or alternatively, the RFID transponder may comprise another oscillator or a temperature sensing unit for this purpose.

A carrier frequency of the response may be modulated at a modulation frequency $f_{LF}$. The modulation frequency $f_{LF}$ may also be called as a "link frequency".

The modulation frequency $f_{LF}$ of the response may, in turn, depend on the clock frequency $f_{CLK}$ of a local oscillator 52. Thus, also the modulation frequency $f_{LF}$ may depend on the temperature of the chip. A change of the modulation frequency $f_{LF}$ may indicate a change in the temperature. Consequently, the modulation frequency $f_{LF}$ may be interpreted to be temperature data.

In addition to temperature, the frequency of a local oscillator may depend on some other environment variable. Generally, the value of an environment variable may change the value of the local frequency, or some other quantity that is being sensed. In addition to temperature, the frequency may depend on the strain, stress, or pressure. These variables are called the environmental variable, and the temperature is considered to be an example of the environment variable.

Furthermore, as will be discussed later, the frequency may depend also on the signal strength used in the measurements. However, the signal strength may be changed with the reader device. In contrast, the environment variable, such as temperature, pressure, or strain, is typically independent of the communication between the reader device and the remote-access apparatus. In this description, the parameters used for communication between the reader device and the remote-access apparatus, such as the TRcal parameter or the signal strength, are not considered as an environment variable.

The local oscillator 52 may be e.g. a ring oscillator. A ring oscillator may comprise e.g. a plurality of cascaded logical gates whose operating speed depends on the temperature. The local oscillator 52 may be e.g. a relaxation oscillator.

The transponder 100 may be arranged to determine a frequency parameter NC, which depends on the frequency of the local oscillator 52. In particular, the frequency parameter NC may indicate the number of pulses of the local oscillator 52 corresponding to the duration of a frequency-setting parameter. In particular, the frequency parameter NC may be substantially equal to the parameter BLF (backscatter link frequency), as defined in the EPC Gen2 protocol. The frequency-setting parameter may refer to the parameter TRCal, as defined in the EPC Gen2 protocol.

The frequency parameter NC comprises information about the temperature when the frequency of the local oscillator 52 depends on the temperature.

The transponder 100 may be arranged to operate such that a response sent by the transponder comprises a binary number corresponding to the value of the frequency parameter NC.

The frequency parameter NC may be stored in a memory MEM1. The transponder 100 may be arranged to operate such that a response sent by the transponder comprises a binary number corresponding to the value of the frequency parameter NC.

The transponder 100 may be arranged to operate such that the value of the frequency parameter NC is sent as a binary number only when the interrogation signal contains a request for said value.

The transponder 100 may comprise a temperature sensor, which is different from the local oscillator 52. The temperature sensor may comprise e.g. a P-N junction, a resistive element, whose resistance depends on the temperature, or a thermocouple. The resistive element may be e.g. a NTC or PTC resistor (NTC refers to negative temperature coefficient, and PTC refers to positive temperature coefficient). The resistive element may be a Pt100 sensor. The temperature sensor may comprise another oscillator, of which frequency depends on temperature. The transponder may be arranged to send a value indicative of the value of the environment variable. The value may be e.g. the voltage over a P-N junction, the resistance of a resistive element, the voltage of a thermocouple, or the frequency of an oscillator.

The temperature sensor may be powered by energy extracted from a radio frequency field. The temperature sensor may be powered by energy extracted from a radio frequency field of one or more interrogation signals.

The transponder may be arranged to convert an analog signal provided by the sensor into temperature data. The temperature data may be stored in a memory MEM1 e.g. as binary data. The transponder 100 may be arranged to transmit the temperature data to a reader e.g. when requested by an interrogation signal.

Figure 2:
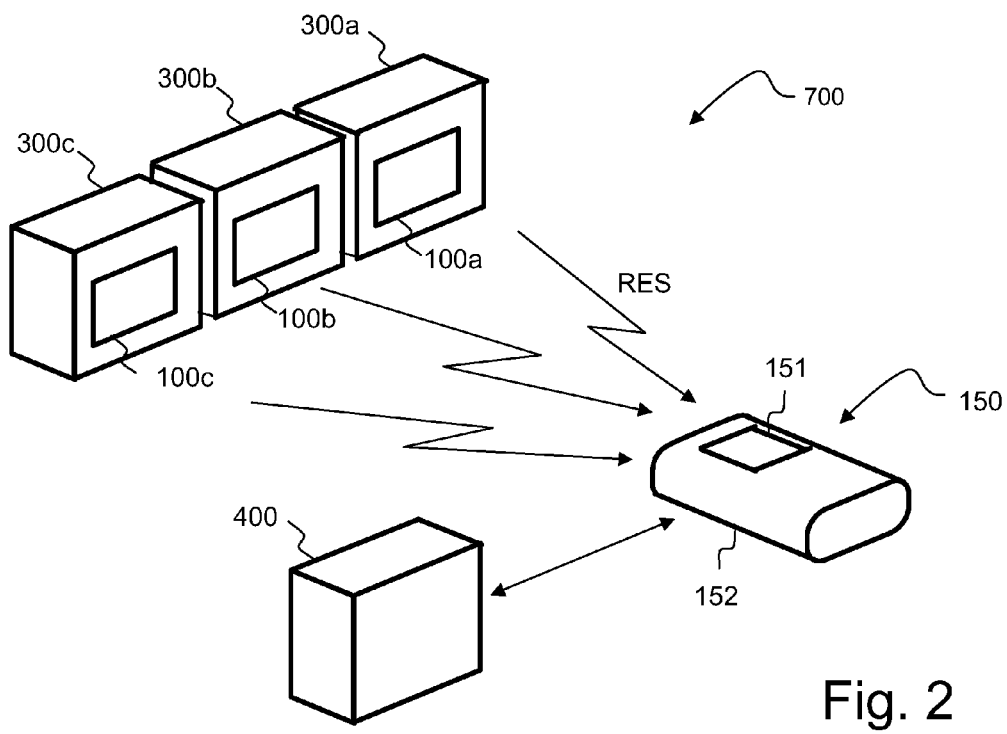
FIG. 2 shows a reader, a data storage unit, and several transponders attached to items.

FIG. 2 shows an apparatus 700 for monitoring an environment variable, such as temperature. The apparatus comprises one or more RFID transponders 100, a reader 150, and an operation unit 400. In an embodiment, the reader device may comprise the operation unit. The transponders 100a, 100b, 100c send signals, which allow monitoring of the temperatures of the items 300a, 300b, 300c. The item 300a may be e.g. an electronic device, battery, hard disc drive, a package containing an item, a package containing foodstuff, a package containing medicine, or a package containing a chemical substance. The signals may be received by a reader 150. The reader 150 may comprise a body 152 and a user interface 151. The user interface 151 may comprise e.g. a visual display for visually displaying the environment variable determined from signals sent from the transponders 100a, 100b, 100c. The user interface 151 may comprise e.g. a keyboard or a touch-sensitive screen for receiving data and/or commands.

Figure 3:
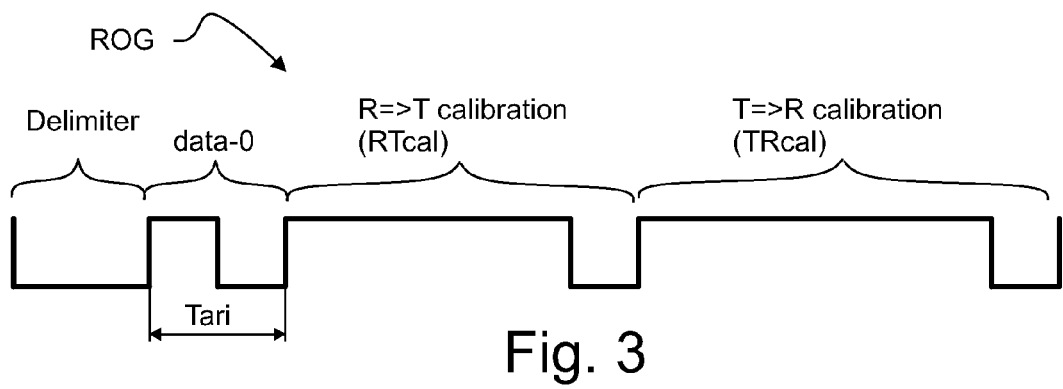
FIG. 3 shows a portion of an interrogation signal sent from a reader.
Figure 4A:
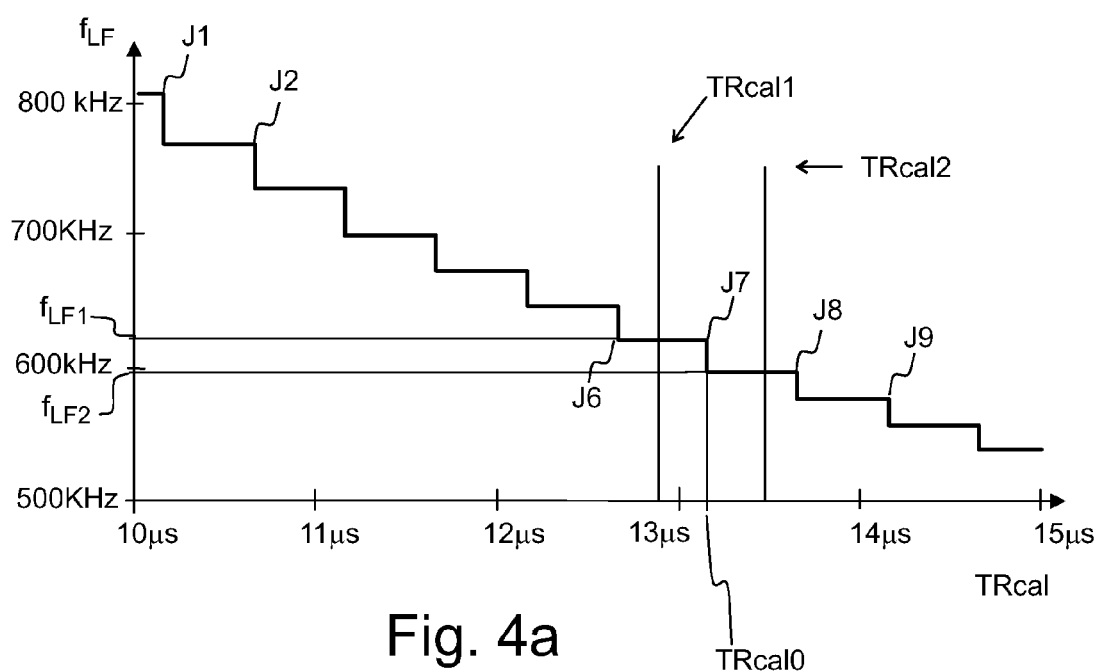
FIG. 4a shows modulation frequency as a function of the frequency-setting parameter of interrogation signal.
Figure 4B:
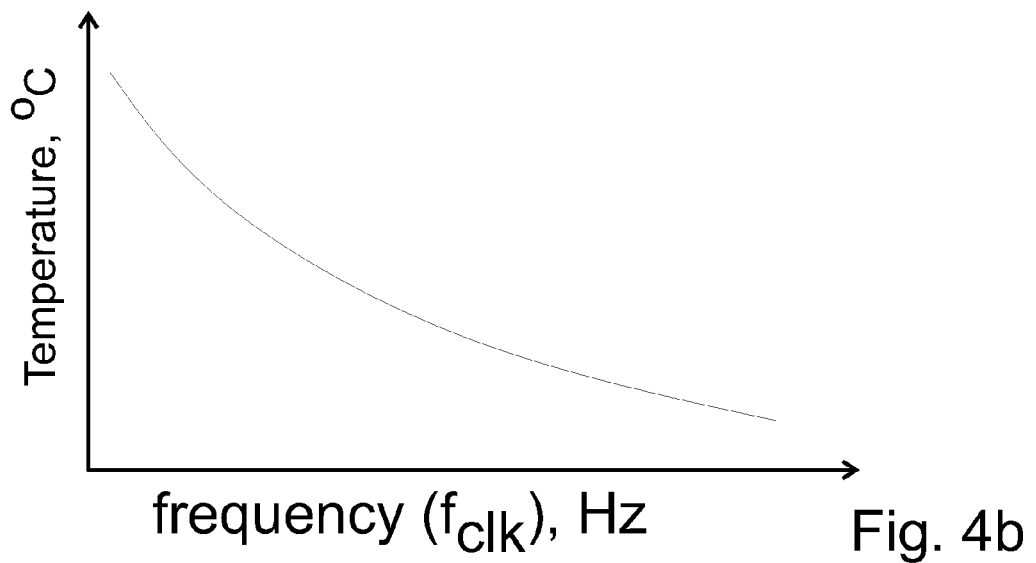
FIG. 4c shows modulation frequency as a function of the frequency-setting parameter of interrogation signal in a first temperature, a second, and a third temperature.
FIG. 4d shows modulation frequency as a function of the frequency-setting parameter of interrogation signal in a temperature with three different signal strengths.

FIGS. 3, 4a, and 4b describe how temperature data can be obtained based on frequency of the local oscillator 52. Using the local oscillator as the sensing element is a widely applicable embodiment, since remote-access apparatuses complying with the EPC Gen 2 protocol comprise such an oscillator. However, as noted above, the remote access apparatus may comprise also other sensors.

Referring to FIG. 3, an interrogation signal ROG sent from a reader to a transponder 100 may comprise a frequency-setting parameter TRcal (reference is made to the EPC Gen2 protocol). The transponder 100 may be arranged to set a modulation frequency ("link frequency") $f_{LF}$ based on the value of the parameter TRcal. The value of the TRcal may be directly proportional to the temporal duration of the data sequence TRcal. The value of the parameter TRcal may be e.g. 50 μs.

The "Delimiter", "data-0", "Tari", and "RTcal" may refer to other portions of the interrogation signal ROG, as defined in the EPC Gen2 protocol.

The transponder 100 may be arranged to set the modulation frequency $f_{LF}$ according to the following equation:

$$f_{LF} = \frac{DR}{TRcal}$$

The modulation frequency $f_{LF}$ may also be called as a "backscatter link frequency".

In practice, the transponder may be arranged to calculate the modulation frequency $f_{LF}$ by using integer numbers as follows:

$$f_{LF} = \frac{DR \cdot f_{CLK}}{\text{ROUND}(TRcal \cdot f_{CLK})}$$

where DR denotes a division ratio parameter. The value of the division ratio parameter DR may be e.g. 8 or 64/3. $f_{CLK}$ denotes the frequency of the local oscillator 52. ROUND denotes a rounding or truncating function, i.e. it rounds or truncates an arbitrary number format to an integer number.

Referring to FIG. 4a, when the value of the frequency-setting parameter TRcal is increased, the modulation frequency $f_{LF}$ may decrease in several (abrupt) jumps J1, J2, ..., as can be derived from the equation. The modulation frequency $f_{LF}$ may be substantially constant between TRcal values corresponding to two adjacent jumps J1, J2, provided that the clock frequency $f_{CLK}$ is constant.

A first response modulated at the first frequency $f_{LF1}$ may be provided by sending a first interrogation signal from a reader to the transponder 100 such that the first interrogation signal comprises a first frequency-setting parameter TRcal1. A second response from the same transponder 100 modulated at the second frequency $f_{LF2}$ may be provided by sending a second interrogation signal from a reader to the transponder 100 such that the second interrogation signal comprises a second frequency-setting parameter TRcal2. By iteration, the TRcal1 and TRcal2 values may be selected such, that the first frequency $f_{LF1}$ is different from the second frequency $f_{LF2}$, i.e. the frequency changes abruptly between TRcal1 and TRcal2. Moreover, to find out the TRcal value, where the frequency jump occurs, the difference between TRcal1 and TRcal2 may be iteratively decreased. A value of the TRcal variable, at which the frequency jump occurs, will be denoted by TRcal0, as depicted in FIG. 4a.

When the value of the frequency-setting parameter TRcal is varied by a small amount in the vicinity of a jump, i.e. the value TRcal0 of FIG. 4, the clock frequency $f_{CLK}$ being substantially constant, the modulation frequency $f_{LF}$ may be abruptly changed from the value $f_{LF1}$ to the value $f_{LF2}$.

It may be derived from the above equation that $$f_{CLK} = \frac{f_{LF1} \cdot f_{LF2}}{DR \cdot (f_{LF1} - f_{LF2})}$$

In other words, the clock frequency $f_{CLK}$ may be calculated from the upper modulation frequency $f_{LF1}$ and lower modulation frequency $f_{LF1}$ associated with a single jump.

The time period between sending the first and second interrogation signals may be selected to be so short that the temperature of the local oscillator is not significantly changed during said time period.

Referring to FIG. 4b, the clock frequency $f_{CLK}$ may depend on the temperature or other environment parameters. Vice versa, mathematically the temperature may be considered to depend on the clock frequency. However, the temperature as determined from the clock frequency depends on the accuracy of the measured frequency. In some systems, it may be difficult to measure the clock frequency accurately, as there may be some deviation in the backscattering frequencies $f_{LF}$.

In an embodiment, the accuracy of the measurements is enhanced by measuring at least two quantities, and using the value of both these quantities and calibration data to determine the value of the environment variable.

Figure 4C:
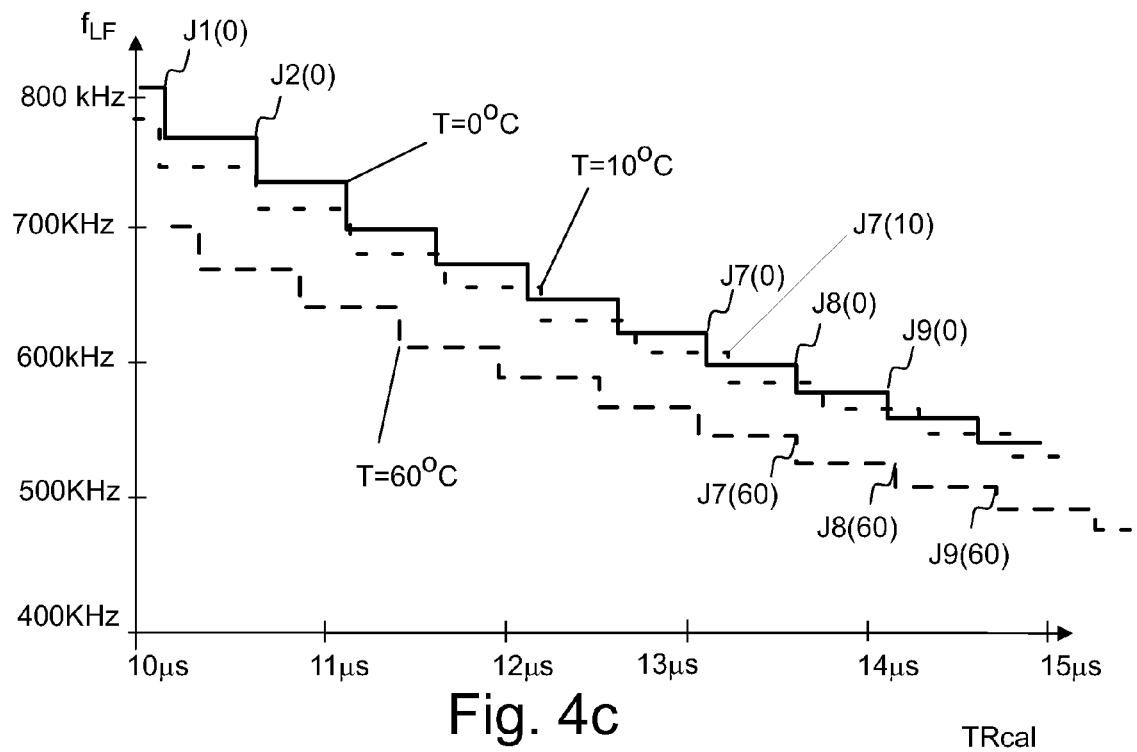

Referring to FIG. 4c, the temperature changes the locations of the frequency jumps. The jumps number 1, 2, 7, 8, and 9 at the temperature T=0° C. are denoted by J1(0), J2(0), J7(0), J8(0), and J9(0), respectively. As the temperature is increased, e.g. to T=10° C., the pattern slightly changes. For example, the jumps may shift towards higher TRcal0 values, as depicted with J7(10). As the temperature is further increased, e.g. to T=60° C., it may happen that some jumps have the same corresponding TRcal0 values. Thus, it is possible that a TRcal0 value may correspond to several temperatures, depending on which TRcal0 value one is measuring. For example, the TRcal0 value corresponding to frequency jump number 8 at temperature 0° C., J8(0), could be the same as the TRcal0 corresponding to frequency jump number 7 at the temperature 60° C., J7(60). Therefore, the TRcal0 value may be used to determine the temperature, if a predetermined valid temperature range is given.

As discussed, both the clock frequency, $f_{clk}$, and the a frequency-setting parameter that matches with a jump, TRcal0, may be measured using a remote-access apparatus. In addition, a value of another sensor may be measured with the remote-access apparatus. In an embodiment, the frequency parameter NC may be directly read from a remote-access apparatus using a reader device. In that embodiment, the remote-access apparatus comprises means for calculating the frequency parameter and means for sending information indicative of the frequency parameter. These quantities will thus be called measurable quantities. For determining the temperature, the value a first measurable quantity, e.g. $f_{clk}$, or TRcal0, needs to be obtained.

The value of the first measurable quantity may be obtained by measuring it with a reader device and a remote-access apparatus. For example, the method for obtaining a value TRcal0' of the first measurable quantity may comprise:

sending a first interrogation signal and a second interrogation signal to the RFID transponder 100, receiving a first response signal from the RFID transponder 100 at a first modulation frequency $f_{LF1}$ and a second response signal from the RFID transponder 100 at a second modulation frequency $f_{LF2}$, wherein the first response signal is a response to the first interrogation signal and the second response signal is a response to the second interrogation signal, determining the TRcal0' value at which the modulation frequency changes using the first and second interrogation signal.

Here the value actually measured is denoted with a superscript ', i.e. by TRcal0', while the parameter in general was denoted by TRcal0. The same naming convention applies to other quantities. The TRcal0' value may also be obtained from a memory, for example when the TRcal0' values have been previously measured. In such a case, the steps required to determine the value of the quantity TRcal0 are performed in another device than where the temperature is determined.

It is also possible to determine the temperature from the frequency of the local oscillator (or another oscillator). In this case, the method for obtaining a value of the first measurable quantity $f'_{osc}$ may comprise:

sending a first interrogation signal and a second interrogation signal to the RFID transponder 100, receiving a first response signal from the RFID transponder 100 at a first modulation frequency $f_{LF1}$ and a second response signal from the RFID transponder 100 at a second modulation frequency $f_{LF2}$, wherein the first response signal is a response to the first interrogation signal and the second response signal is a response to the second interrogation signal, determining a clock frequency $f'_{osc}$ from the first modulation frequency $f_{LF1}$ and the second modulation frequency $f_{LF2}$.

The frequency may also be received from a memory. In such a case, the steps required to determine the value of the clock frequency are performed in another device than where the temperature is determined.

Since the oscillator frequency $f_{osc}$ may be used to calculate the temperature, it is evident that also the link frequency difference can be used, since the clock frequency and the link frequencies are dependent on each other as discussed previously: $f_{CLK} = f_{LF1} f_{LF2}/(\Delta f_{LF} DR)$, where DR denotes a division ratio parameter. Therefore, it is also possible to determine the temperature from the height of the frequency jump, $\Delta f_{LF} = f_{LF1} - f_{LF2}$ (cf. FIG. 4a). In this case, the method for obtaining a value of the first measurable quantity $\Delta f'_{LF}$ may comprise essentially the same steps as was discussed for the frequency. The height of a frequency jump $\Delta f'_{LF}$ may be determined from the first modulation frequency $f_{LF1}$ and the second modulation frequency $f_{LF2}$.

The height of the frequency jump may also be received from a memory. In such a case, the steps required to determine the value of the clock frequency are performed in another device than where the temperature is determined.

It is also possible to determine the temperature from the frequency parameter NC or an output S of a sensor, wherein the sensor is located in or on the remote-access apparatus. In the latter case, the method for obtaining a value S' of the first measurable quantity, i.e. the value for the output of a sensor, may comprise:

sending an interrogation signal to the RFID transponder 100, receiving a response signal from the RFID transponder 100, wherein the response signal comprises information indicative of the output of the sensor, and obtaining the value of the measurable quantity from the response signal.

Alternatively, the value of the frequency parameter could be obtained in the way described above for the quantity S.

In addition to the value of the first measurable quantity, a value of a second measurable quantity may be obtained and used to enhance the accuracy of the measurements. Therefore, the method for determining the environment variable may comprise:

obtaining a value of a first measurable quantity from the raw data, the first measurable quantity being indicative of the environment variable, obtaining a value of a second measurable quantity, the second measurable quantity being indicative of the environment variable, determining the value of the environment variable using the using calibration data, the value of the first measurable quantity, and the value of the second measurable quantity.

Figure 7A:
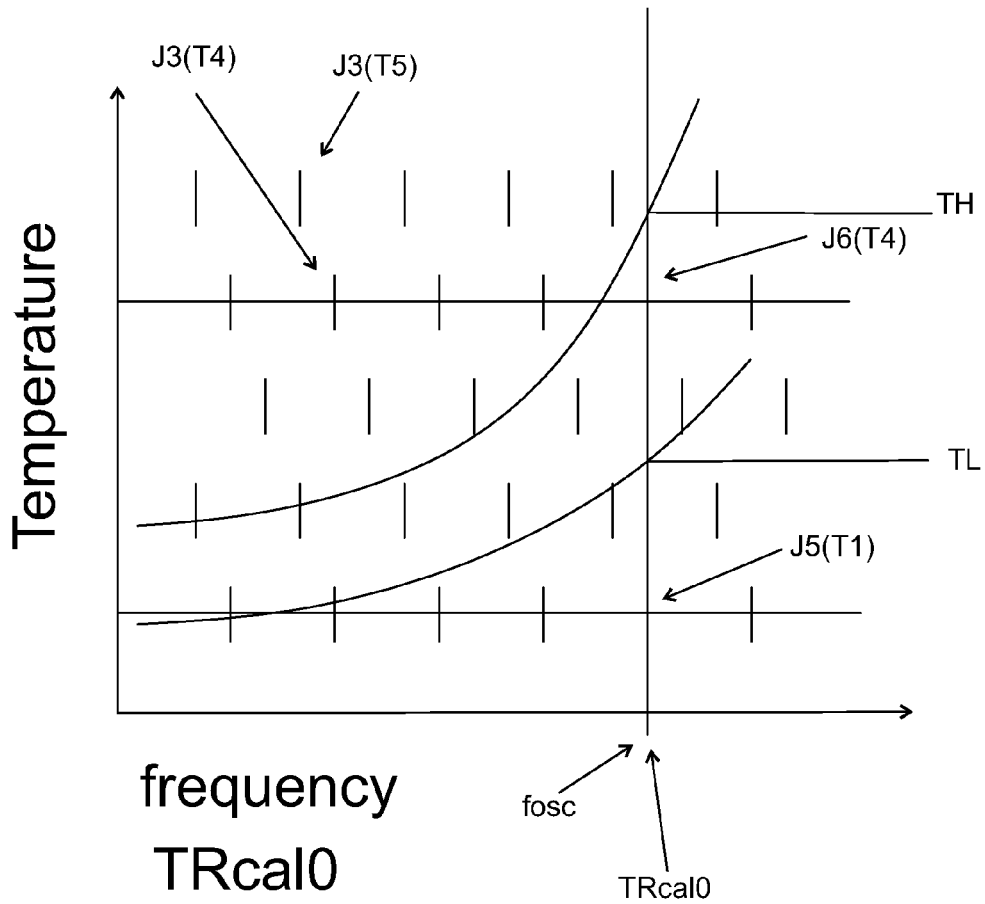
FIG. 7a shows the temperature as function of frequency and as function of the frequency setting parameter.

Referring to FIGS. 4c and 7a, there is a no one to one correspondence between the quantity TRcal0 and the temperature. However, referring to FIG. 4b, there is a one to one correspondence between the frequency of a local oscillator and the temperature. In some cases this latter relation may be inaccurate. Therefore, as shown in FIG. 7a one may first use the value of the frequency, $f_{osc}$, to determine a temperature range [TL,TH] to which the temperature belongs. Using this range, one may use the TRcal0' value to obtain the index of the TRcal0' value and the more accurate temperature. Referring to FIG. 7a, by comparing the TRcal0' value to known TRcal0 values, it may be noticed, that the TRcal0' value could correspond to the frequency jump number 6 at temperature T4, J6(T4), or to the frequency jump number 5 at temperature T1, J5(T1). As T1 does not belong to the known range [TL,TH], the temperature may be determined to be T4. Thus, the local frequency could be used to determine an approximate temperature, and this information can be used to determine the index of the frequency jump to which the TRcal0' value corresponds to.

As discussed above, it has been noticed, that the quantity TRcal0 may be used to enhance the accuracy of temperature measurements by using both the TRcal0 and the clock frequency values in the determination of the temperature. This applies also more generally to any environment variable that is measured with the method.

Thus, in an embodiment, the method for determining the value of an environment variable:

obtaining a value of a first measurable quantity from the raw data, the quantity being indicative of the environment variable, wherein the first measurable quantity is the frequency of the local oscillator, obtaining a value of a second measurable quantity, the second measurable quantity being indicative of the environment, determining the value of the environment variable using calibration data, the value of the first measurable quantity, and the value of the second measurable quantity.

In the method, the step "determining the value of the environment variable" comprises determining at least one initial value of the environment variable using the calibration data and the value of the first measurable quantity, and determining the value of the environment variable is using the at least one initial value of the environment variable and the value of the second measurable quantity.

In the method, the determination of different variables is based on calibration.

Figure 7B:
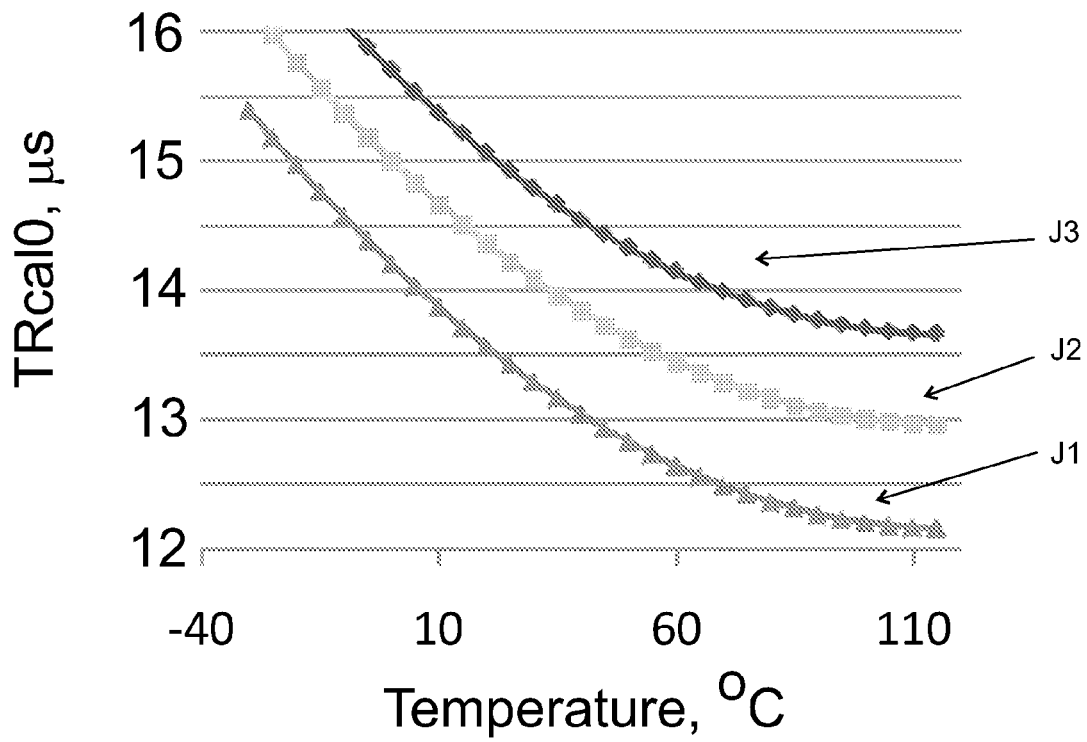
FIG. 7b shows three frequency setting parameters corresponding to a frequency jump as function of the temperature.
Figure 7C:
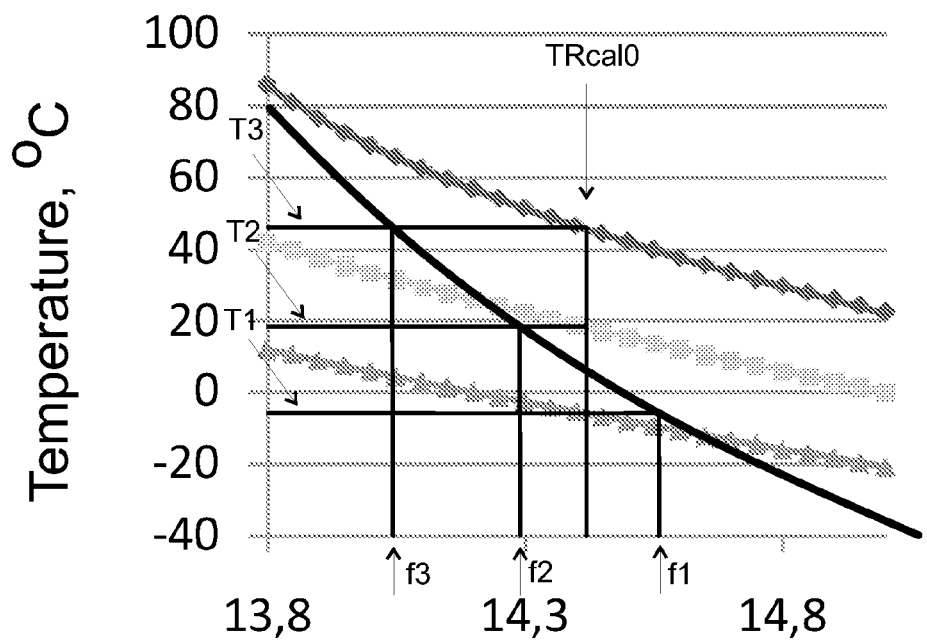
FIG. 7c shows a method for choosing the correct temperature from the three temperatures of FIG. 7b.

Referring to FIGS. 7b and 7c, it is also possible to determine a set of temperatures from the TRcal0' value, and later use the frequency of local oscillator to choose the correct temperature value. As an example, in FIG. 7b, the relation between the quantity TRcal0 and temperature is shown. Referring to FIG. 7b, a single TRcal0' value may correspond to several temperatures, depending on whether the TRcal0' value is considered to correspond to frequency jump number 1, 2, or 3, as denoted by J1, J2, and J3.

Referring to FIG. 7c, having received the TRcal0' value, one may first determine a set of possible temperature, such as T1, T2, and T3 from the TRcal0' value. As an example, in FIG. 7c, the temperatures of about −5, 20, and 50 might correspond to the TRcal0 value of 14.4 μs. Now, depending on the frequency, a correct temperature may be chosen. For example, a frequency $f'_{osc}$ close to f3=140 kHz might indicate the temperature T3, a frequency $f'_{osc}$ close to f2=143 kHz might indicate the temperature T2, and a frequency $f'_{osc}$ close to f1=146 kHz might indicate the temperature T1. Thus, the TRcal0' may be used to determine a set of initial environment variables (T1, T2, T3), and the frequency may be used to select the correct temperature. In addition, the frequency may be used to determine another initial environment variable $T'_0$, and the temperature may be obtained as a combination of the chosen temperature (T1, T2, or T3) and the initial temperature $T'_0$.

For example, in an embodiment, "determining at least one initial value of the environment variable using the calibration data and the value of the first measurable quantity" would mean to determine the possible temperatures, as discussed above, and the actual value of the environment variable is determined using the value of the second measurable quantity by choosing the correct temperature.

Referring to FIG. 4c, in addition to the frequency of the oscillator, the link frequency $f_{LF}$ may also be used to determine the index of the jump that corresponds to the TRcal0' value. For example, even if the TRcal0' value corresponding to frequency jump number 8 at temperature 0° C., J8(0), could be the same as the TRcal0' value corresponding to frequency jump number 7 at the temperature 60° C., J7(60), the link frequency is still different. In the figure, the corresponding link frequency at the temperature T=60° C. is lower than in the zero temperature. It is noted, that while measuring the TRcal0' value, two different link frequencies are measured, since TRcal0' corresponds to the TRcal values at which a jump in the link frequency occurs. Either the upper link frequency ($f_{LF1}$ in FIG. 4a) or the lower link frequency ($f_{LF2}$ in FIG. 4a), or their combination may be used to indentify the jump index. For clarity, the link frequency that is used to indentify the jump index will be denoted by $f_{LF}$ and the measured value by $f'_{LF}$. Therefore, the environment variable may be determined using TRcal0' and $f_{LF}$ e.g. such that a set of possible temperatures {T1(TRcal0), T2(TRcal0), T3(TRcal0), . . . , Tn(TRcal0')} is determined using TRcal0', and $f'_{LF}$ together with TRcal0' is used to determine the jump index, and temperature. Thus, there is a functional relation between the temperature and the values: T=h(TRcal0, $f_{LF}$). Furthermore, referring to FIG. 4c, the value of the link frequency may be used to enhance the accuracy of the determined temperature, since in addition to the TRcal0' value, also the link frequency depends on the temperature.

Figure 4D:
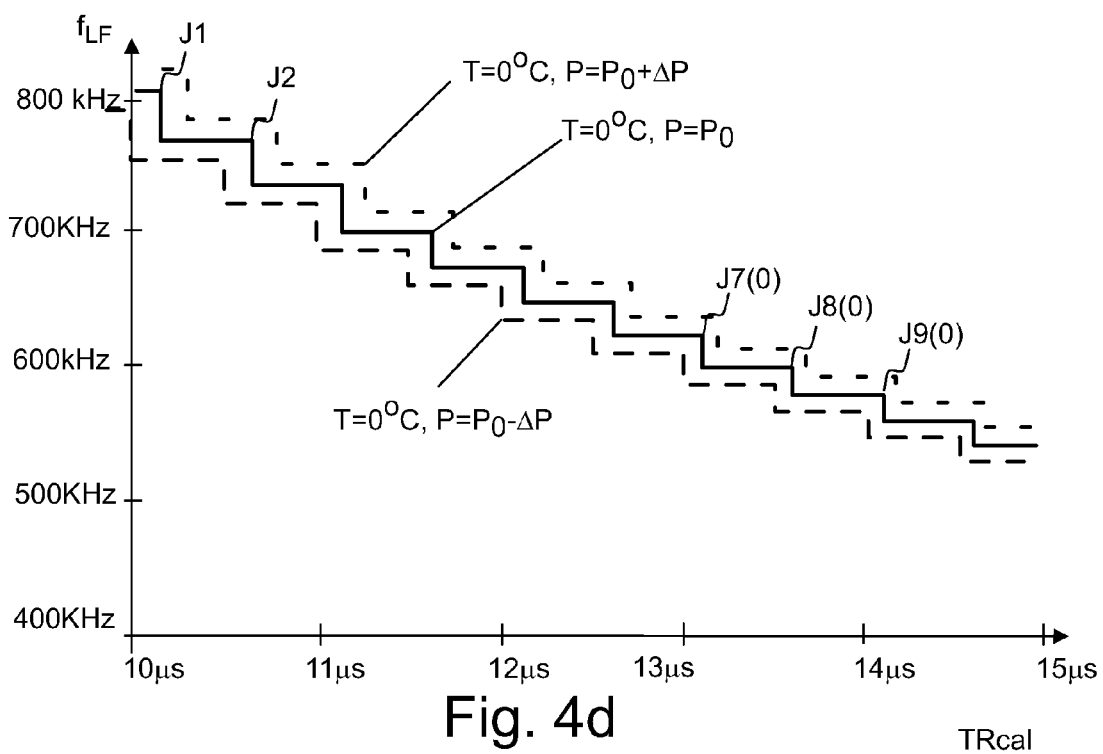

Referring to FIG. 4d, it has been noticed, that the link frequency, and therefore also the TRcal0 value, in which the frequency jump occurs may depend on the signal strength. Signal strength refers here to the RF power level experienced by the RFID tag/transponder and originating from the RFID reader device. This RF power level affects the signal levels at the local oscillator reflecting into the link frequency and thus into the TRcal0. Therefore, for example, depending on the distance between the RFID reader and the RFID tag, the RF power level can be vary.

In FIG. 4d three patterns are shown: one for a typical RF power level $P_0$, denoted by "T=0° C., P=$P_0$", another for another power level, as denoted by "T=0° C., P=$P_0$+ΔP", and a third for a third power level, as denoted by "T=0° C., P=$P_0$−ΔP". For example, operation of the local oscillator 52, another oscillator, or temperature sensor may slightly depend on the voltage provided by the voltage supply VREG1 in the RFID tag. Moreover, voltage provided by the voltage supply may depend on the amplitude of the interrogation signal ROG at the remote-access apparatus. Therefore, both the clock frequency and the a frequency-setting parameter that matches with a jump may depend also on the strength of the interrogation signal at the remote-access apparatus. The strength of the signal transmitted by the reader device may also be indicative of the strength of the signal at the remote-access apparatus. A signal strength indicator may be indicative of signal strength at the remote-access apparatus.

Figure 5:
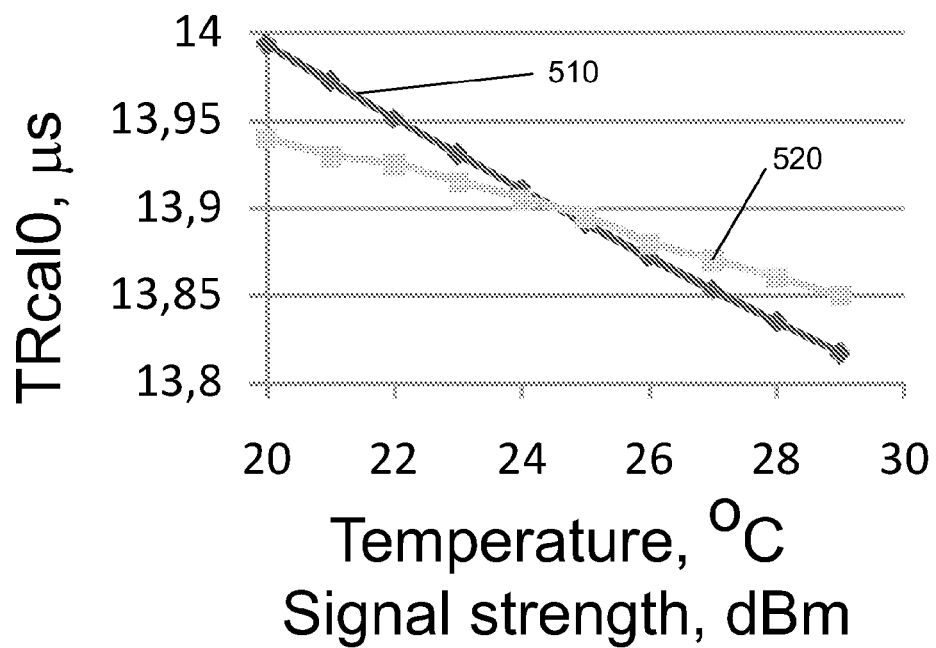
FIG. 5 shows the frequency setting parameter corresponding to a frequency jump as a function of temperature for a given signal strength and as function of signal strength in a given temperature.

The dependence of the TRcal0 parameter on both the temperature and the signal strength is further illustrated in FIG. 5. FIG. 5 shows, as an example, the variation of the TRcal0 parameter with these variables. This is shown by considering TRcal0 a function 510 of temperature, when the signal strength is constant. This is also shown by considering TRcal0 a function 520 of signal strength, when the temperature is constant.

It has also been noticed that the signal strength may be used to enhance the accuracy of temperature measurements by using a signal strength indicator in the determination of the temperature. Furthermore, it has been noticed, that the dependence of the determined temperature on the signal strength may be removed by using a regulated signal strength. It has also been noticed that the dependence of the determined temperature on the signal strength may be diminished by using a regulated signal strength and a signal strength indicator. The dependence on signal strength may either be removed or diminished depending on how accurately the signal strength is regulated. For accurate regulation, the dependence is removed, as the signal strength is always the same. However, for an inaccurately regulated signal strength, information indicative of the strength may be used to enhance the accuracy. In addition to temperature, this applies also more generally to any environment variable that is measured with the method. A signal strength indicator will be denoted by P.

The method for determining the value of an environment variable may thus comprise:

(a)
    obtaining a value a value ($f_{osc}$ TRcal0', $\Delta f_{LF}$, S', NC') of a first measurable quantity from the raw data, the quantity being indicative of the environment variable,
    obtaining a value of a signal strength indicator, and
    determining the value of the environment variable using calibration data, the value of the first measurable quantity, and the value of the signal strength indicator; or (b)
    obtaining a value ($f_{osc}$ TRcal0', $\Delta f_{LF}$ S', NC') of a first measurable quantity from the raw data, the quantity being indicative of the environment variable, and the quantity being measured with a regulated signal strength, and
    determining the value of the environment variable using calibration data and the value of the first measurable quantity, wherein the calibration data is formed using calibration measurements with the regulated signal strength; or (c)
    obtaining a value a value ($f_{osc}$ TRcal0', $\Delta f_{LF}$ S', NC') of a first measurable quantity from the raw data, the quantity being indicative of the environment variable, and the quantity being measured with an regulated signal strength,
    obtaining a value of a signal strength indicator, and
    determining the value of the environment variable using calibration data, the value of the first measurable quantity, and the value of the signal strength indicator.

Calibration data means data that is used to convert the values of the measurable quantities to the value of the environment variable. For the sake of wording, the signal strength indicator may be considered a second measurable quantity.

The remote-access device may need to be calibrated by making calibration measurements the measure the response in a known environment. In case a regulated signal strength is used, the same regulated signal strength may be used both in the calibration measurements and the measurements.

Figure 6A:
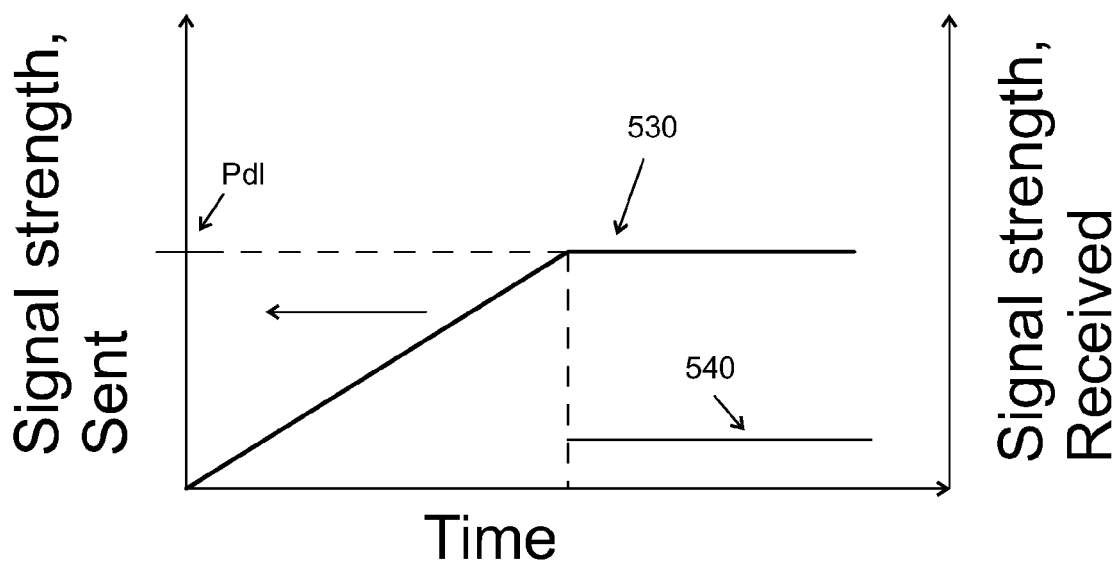
FIG. 6a shows the strength of a sent signal and the strength of a received signal as function of time in an embodiment.

Consider first methods to regulate the signal strength. Referring to FIG. 6a, the regulated signal strength may be e.g. a detection limit of the remote-access apparatus. The reader device may send an interrogation signal to the remote-access apparatus with a signal strength "signal strength, sent". The signal strength may be increased up to the point, where the remote-access apparatus starts to respond. This signal strength is indicated by Pdl in FIG. 6a, and the signal strength sent by the RFID reader device is indicated by the reference number 530. Initially the signal strength may be low, and therefore, the remote-access apparatus will not respond, i.e. it will not be detected. As soon as the power is increased to the detection limit Pdl, the remote-access apparatus starts to respond. The strength of a signal, the signal received by the RFID reader device sent by the remote-access apparatus, is indicated by the reference number 540. The signal strength Pdl may be used in combination with the frequency of local oscillator and/or the TRcal0 value to determine the environment variable, such as temperature. In this process the value of the signal strength indicator is implicitly known to correspond to the detection limit. In this embodiment, a reader device may obtain a value of a strength indicator P' as a result of an iterative process.

A remote-access apparatus may also be equipped with an indicator of signal strength. As discussed, the detection limit provides a logic that indicates that a strong enough signal is used. Similarly, the remote-access apparatus may be equipped with a detection circuit and logic that may indicate when a signal strength level has been exceeded. The detection circuit may comprise a voltage meter or a current meter. In such a system, the iterative process, as discussed above may be used to obtain a known signal strength. In that case the power of the reader device would be increased up to the point, where the remote-access apparatus would indicate that a regulated signal strength has been reached. This level could be higher than the detection limit.

Either of these regulated signal strengths, the detection limit, or the higher limit, could be used to enhance the accuracy of the measurements. In particular, the calibration measurements could be made with the same regulated signal strength as the actual measurements.

Figure 6B:
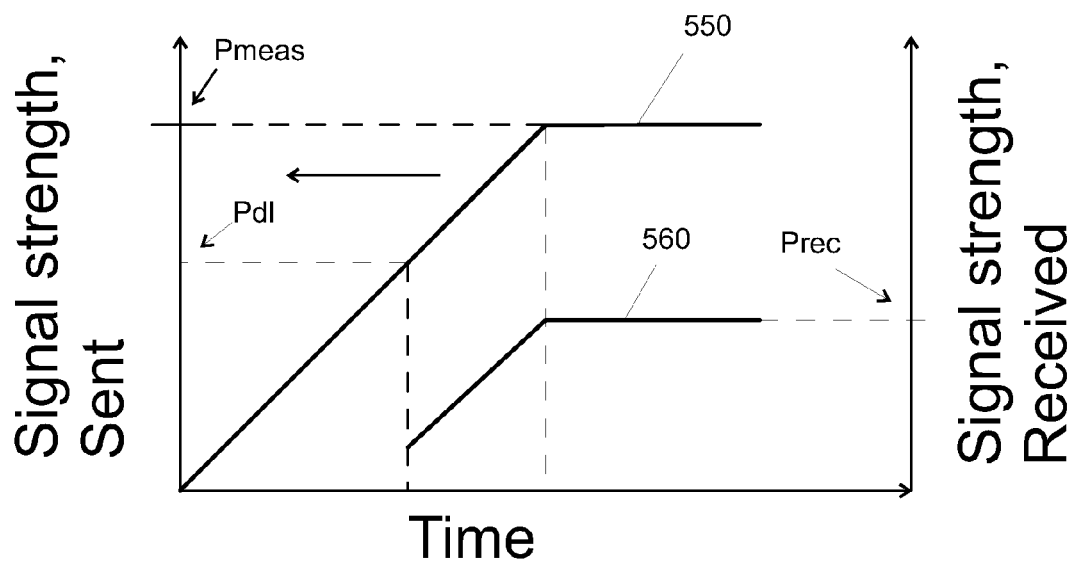
FIG. 6b shows the strength of a sent signal and the strength of a received signal as function of time in another embodiment.

Referring to FIG. 6b, in one embodiment, the reader device measures the signal strength received by the reader device. A threshold value at the reader device may be used such that the signal strength is considered sufficient once the threshold for the received signal strength is exceeded. As an example, the sent signal strength 550 may be initially low and increasing. As the detection limit $P_{dl}$ is exceeded, the remote-access apparatus starts to respond, and a signal is received be the reader device. However, the strength of the sent signal may be increased up until the strength of the received signal 560 reaches a predetermined limit $P_{rec}$. The measurements may then be performed by sending the signals with a sent signal strength $P_{meas}$. As shown in the figure, the sent signal strength $P_{meas}$ corresponds to the received signal strength $P_{rec}$.

In case the remote-access apparatus is capable of communicating the received signal strength actually received by the remote-access apparatus, the process described in FIG. 6b is equally applicable. The received signal strength would in that case be received from the remote-access apparatus, not detected by the reader device. In this case the RFID chip may comprise means for detecting the signal strength and means for communicating the signal strength to the reader device. The received signal strength may by measured accurately or with a low level of accuracy, e.g. a 2, 3, or 4-bit integer. In such a system the remote-access apparatus may comprise means for determining the strength of a measuring signal. The means may be e.g. a voltage meter or a current meter. As discussed, the meter may also provide the result with a one bit accuracy: either a limit is exceeded or not. The remote-access apparatus may also comprise means for sending information indicative of the signal strength.

Still further, the reader device may use also other algorithms to find the regulated signal strength. For example, in case the remote-access apparatus indicates the signal strength only with one bit (e.g. "enough" or "not enough"), the reader may also start with a high signal strength and decrease it until the limit is found. In addition, the signal strength may be initially tuned (i.e. increased or decreased) with large steps, and when the approximation for the limit is found, the step will be decreased. In case the remote-access apparatus is capable of communicating the signal strength more accurately, also other optimization schemes may be used to tune the strength of the measuring signal to find the correct regulated signal strength. Still further, the reader device may tune the sent signal strength using the information received from the remote-access apparatus. The sent signal strength may be tuned e.g. to keep the signal strength at the remote-access apparatus constant.

As discussed above, the power level at the remote-access apparatus may be regulated by:
    the reader device, by measuring whether or not a signal is received from the remote-access apparatus and controlling the sent signal strength (FIG. 6a), the reader device, by measuring the received signal strength and controlling the sent signal strength (FIG. 6b), the reader device, by receiving information on the signal strength received by the remote-access apparatus, from the remote access apparatus, and controlling the sent signal strength, or the reader device, by receiving a value of the signal strength received by the remote-access apparatus, from the remote access apparatus, and controlling the sent signal strength.

In addition, the power level at the remote-access apparatus may be regulated also by the remote-access apparatus. This may be done e.g. by including a voltage regulator in the power supply of the remote-access apparatus. In that case, the remote-access apparatus may comprise a voltage regulator that regulates the voltage supplied by the power supply VREG1 to the other units of the RFID chip.

The voltage regulator of the remote access apparatus may also be configured to operate in two states: in a first state set, where the voltage regulator does not regulate the voltage, and consumes essentially no energy, and in a second state, where the voltage is regulated. The second state may be used when frequency information is being measured, and the first state may be used for other communication between the reader device and the remote-access apparatus. This has the advantage of saving energy, as the voltage regulator needs some power to operate.

It is also noted, that in addition to the frequency of the local oscillator, also the output S of another sensor may depend on the power level and therefore on the signal strength. The effect the signal strength has on the measurements may be also in this case be taken into account, removed, or diminished and taken into account, as discussed above.

It is also possible to measure the value of two measurable quantities with a regulated signal strength, and enhance the accuracy of the measurements by using information of both the measurable quantities. E.g. both the frequency of the oscillator and the TRcal0' value may be measured using a regulated signal strength, and the this information may be used as discussed above. Alternatively, the backscattering frequency or the height of a frequency jump together with the TRcal0' value using regulated signal strength may provide accurate results.

As discussed above, an indicator for the signal strength—the signal strength indicator P—may be used to enhance the accuracy of the measurements. The signal strength indicator may be obtained at least:

as a result of an iterative process, as was shown in FIGS. 6a and 6b,
from the remote-access apparatus, as discussed above, or
from the reader device.

The signal strength indicator may be e.g. the Received Signal Strength Indicator (RSSI) variable provided with the UHF Gen 2. The RSSI parameter is commonly determined by the reader device, and therefore it is not necessarily the signal strength at the remote access device. However, the parameter may be indicative of the signals strength at the remote access apparatus.

A remote-access apparatus may also be capable of measuring the signal strength at the remote-access apparatus, and send this information to the reader device.

In case the value of the environment variable is determined from a frequency jump, at least two measurements are needed. The first response signal may comprise information indicative of a first signal strength and the second response signal may comprise information indicative of a second signal strength. A signal strength indicator may be calculated as an average value of these variables, or either of the variables may be used as the signal strength indicator.

Moreover, the value of the signal strength indicator may be deduced from the power level used by the RFID reader. E.g. the power level used for sending the first interrogation signal may be used as the signal strength indicator. Also, the power level used for sending the second interrogation signal may be used as the signal strength indicator. And further, the average of the power level used for sending the first interrogation signal and the power level used for sending the second interrogation signal may be used as the signal strength indicator.

The attenuation of the interrogation signals may depend on the distance between the reader device and the remote-access apparatus, and on the material in between the reader and the remote-access apparatus. Thus, the signal strength indicator may be a normalized power level, where the power level of the RFID reader device is normalized by the distance between the reader device and the remote-access apparatus, and the material in between the reader and the remote-access apparatus. As discussed above, the normalized power level may be calculated from either of the interrogation signals or their average. Still further, the power level may be normalized with a value describing the RF coupling strength between the reader device and the remote-access apparatus. The coupling strength may depend on the orientation mutual orientation of the reader device the remote-access apparatus. The coupling may also depend on the material the remote-access apparatus is attached on. E.g. the coupling may be different in the cases where the remote-access apparatus is located on a metal package or a cardboard package.

As the modulation frequency may depend also on a strength of a signal at the remote-access apparatus, it has been noticed that the also the measurable quantities may depend on the strength of a signal at the remote-access apparatus. A signal strength indicator may be indicative of signal strength at the remote-access apparatus. Thus, the measurable quantity may depend on a signal strength indicator. For example, in a constant temperature, the measurable quantity may have a value $f_{osc}$ for a typical signal strength. However, as the signal strength changes, some offset is seen for the measurable quantity. A signal strength indicator may be indicative of the signal strength, and the signal strength indicator will be denoted by P.

The signal strength may change if the power level of the reader device is changed. Provided that the signal strength sent by the reader device is kept constant, the signal strength at the remote-access apparatus may change at least in the following situations:

the distance between the remote-access apparatus and the reader device changes;
an object is moved in between the remote-access apparatus and the reader device;
the reader device is changed;
the remote-access apparatus is attached to a different substrate, e.g. a metal package;
the orientation of the remote-access apparatus is changed, whereby the coupling of the antenna of the remote-access apparatus and the antenna of the reader device is changed; and
the orientation of the reader device is changed, whereby the coupling of the antenna of the remote-access apparatus and the antenna of the reader device is changed.

In these cases also the signal strength indicator may change. As can be seen from the above discussion, there are many practical situations, in which the signal strength must be taken into account for assuring accurate results. It is also possible that the reader device tunes the sent signals strength such that the signals strength at the remote-access apparatus is essentially constant regardless of the described changes.

As for obtaining a value of a signal strength indicator, the signal strength indicator may be considered a second measurable quantity. The second measurable quantity—the signal strength indicator P—may be indicative of the signal strength at the remote-access apparatus. In this case, the second measurable quantity may be indicative of the measurement conditions, where the first measurable quantity is measured.

Therefore, the method for determining the environment variable may comprise:
  obtaining a value of a first measurable quantity from the raw data, the quantity being indicative of the environment variable,
  obtaining a value of a second measurable quantity, the second measurable quantity being indicative of the measurement conditions of the first measurable quantity, and
  determining the value of the environment variable using the
using the calibration data, the value of the first measurable quantity, and the value of the second measurable quantity.

Furthermore, a signal strength indicator, P, may be used to enhance the accuracy of the measurements, even if both the frequency of local oscillator and the TRcal0 value are used in the determination of the temperature.

Thus, in an embodiment, the method for measuring the temperature comprises:
  obtaining a value of a first measurable quantity from the raw data, the quantity being indicative of the environment variable, the first measurable quantity being the local frequency,
  obtaining a value of a second measurable quantity, the second measurable quantity being indicative of the environment variable, and further comprises
  obtaining a value (P') of a signal strength indicator,
  determining value of the environment variable using the calibration data, the value of the first measurable quantity, the value of the second measurable quantity, and the signal strength indicator.

Every method described above can be applied to measure the value of and environment variable, e.g. temperature. A quantity that changes with the environment variable is called a first measurable quantity. As discussed above, examples of the measurable quantity are the local frequency, the TRcal0 value, and the height of the jump $\Delta f_{LF}$. It is also possible that the remote-access apparatus includes a sensing element to sense some other environment variable, in which case the measurable quantity S may be the output of the sensor. Examples include a piezoresistive sensing element to sense strain by sensing the resistance; and capacitive sensing elements to sense contact pressure by sensing capacitance. Furthermore, the frequency parameter NC may also be measurable from a remote access apparatus. Moreover, the environment variable may change the value of some other, such as a second, measurable quantity.

In addition, a combination of measurable quantities may serve as the first measurable quantity. E.g. a combination of the local frequency and the TRcal0 value of a reader device, at which the backscattering frequency of a remote-access apparatus changes, may serve as the first measurable quantity. Still further, several measurable quantities may be used to determine the value of an environment variable. For example, the local frequency may be used to determine a first temperature, and the TRcal0 to determine a second temperature. Then the value of temperature may be obtained as a combination of said first and said second temperatures.

The first measurable quantity may depend on an environment variable. It may also depend on a second measurable quantity such as a signal strength indicator. Therefore, in some cases the value of the environment variable may be determined, once the relation between the first measurable quantity, the second measurable quantity, and the environment variable is known. This relation can be made known by calibrating the remote-access apparatus or a number of remote-access apparatuses. After calibration, these measurable quantities may be used to determine the temperature.

However, the dependence between the measurable quantity and the environment variable is not generally known a priori, but needs to be found out by calibration. After calibration, the value of the environment variable may be determined based on the measured quantities. Without loss of generality, the first measured quantity will be denoted by $f_{osc}$ and the environment variable by T. It is explicitly noted that the first measurable quantity $f_{osc}$ may also refer to the quantity TRcal0 or the height of the frequency jump, $\Delta f_{LF}$. Therefore, in the method for determining the temperature, calibration data may be needed in various steps. For example calibration data is needed in the steps "determining the temperature using . . . " and "determining at least one initial value . . . ".

The value of an environment variable may change the value of the first measurable quantity. For example, temperature may change the frequency of a ring oscillator, and therefore the oscillation frequency (or oscillation period) of the oscillator may be used to determine the temperature. It is also possible, that the frequency may depend on the strain. Alternatively, if the chip is in a strained state, internal stress is induced in the chip. Moreover, external pressure may induce these internal stress and strain. Therefore, such environment variables may include temperature, pressure, stress and strain. Furthermore, if the remote-access apparatus comprises a sensing unit, an environment variable may change a measurable quantity of this sensing unit. Examples include humidity and acidity. However, the dependence between the measurable quantity, the signal strength indicator and the environment variable is not generally known a priori, but needs to be found out by calibration. After calibration, the value of the environment variable may be determined based on the measured value of the measurable quantity and the value of the signal strength indicator.

As discussed, it is also possible that the accuracy of measurements is enhanced by using a regulated signal strength. Preferably, the same regulated signal strength is used for calibration measurements and for other measurements.

As for calibration with regulated signal strength, a relation between the environment variable T and a measurable quantity, such as $f_{osc}$, TRcal0, $\Delta f_{LF}$, S, or NC should be known with reasonable accuracy while using a regulated signal strength. The signal strength may be regulated by the reader device or by the remote-access apparatus. Also quite generally, some function may be used to describe this relation. In particular, a functional relation T=h(S) should be found by calibration. (Notice here that S may refer also to another first measurable quantity than the one obtained from a sensor). In this case there may be a functional relation describing the temperature for measurements with a regulated signal strength: T=h(S). The function h may be e.g. a polynomial. For the measurements, the same regulated signal strength may be used for optimal accuracy. However, if not exactly the same signal strength is used in the measurements, a signal strength indicator may be used to enhance the accuracy. In that case the signal strength indicator may be regarded as a second measurable quantity. Calibration of the remote-access apparatus for measurements with at least two quantities in general will be discussed below. It may also be possible to enhance the accuracy by combining the frequency information of the local oscillator with the output of the sensor.

Calibration of the remote-access apparatus for measurements with at least two quantities means that a relation between the environment variable T and at least two of $f_{osc}$, TRcal0, $\Delta f_{LF}$, S, and P should be known with reasonable accuracy. Also quite generally, some function may be used to describe this relation. In particular, a functional relation T=h(P,$f_{osc}$) should be found by calibration. (Notice here that $f_{osc}$ may refer also to another first measurable quantity than the frequency). As noted earlier, the temperature may not, in general, be obtained as a function of the TRcal0, since one TRcal0 value may correspond to several temperature values. In case TRcal0 is used, one may operate in a predetermined temperature range, in which case the temperature may be a function of TRcal0 value. In this case there may be a functional relation describing the temperature: T=h(TRcal0,P).

As discussed above, it is also possible, that the temperature is a function of both the frequency and the TRcal0 value. In this case there may be a functional relation describing the temperature: T=h(TRcal0,$f_{osc}$). Furthermore, the accuracy may be further enhanced with the signal strength indicator: T=h(TRcal0,$f_{osc}$,P) $f_{osc}$.

Calibration may be done with well known curve fitting algorithms. Typically calibration measurements are performed, and some curve, i.e. function, fitted to the calibration measurement data. For example, a number of triplets ($f'_{osc,i}$; $P'_i$;$T'_i$) may be measured in the calibration measurements, where i is the number of the measurement, $f'_{osc,i}$ is the value of the value of the measured quantity in ith measurement, $P'_i$ is the value of the value of the signal strength indicator in ith measurement, and $T'_i$ is the reference value of the environment variable in ith measurement. It should be emphasized, that $T'_i$ is the value of the environment variable in the remote-access device, where the measured quantity is measured. The case, where the TRcal0' value is measured will be described later.

For calibration, a function h may be used to interpolate or extrapolate the relation between these values such that T($f_{osc}$, P)=h($f_{osc}$,P) and $T'_i$·h($f'_{osc,i}$,P') for all i. Here the quantities are denoted by T, $f_{osc}$, and P, and their respective measured values by T', $f'_{osc}$, and P'. If the remote-access device is calibrated for some power levels separately such that for a given power level, a given relation between $f_{osc}$ and T is used, the functional form of h can be a low degree polynomial on the measurable quantity, e.g. h($f_{osc}$,P)=$b_{1,Pl}f_{osc}+b_{0,Pl}$, where the coefficients b of the polynomial are calculated for each power level Pl separately. Naturally also higher degree polynomial are possible.

In addition to different coefficient at different power levels, the coefficients of the polynomial may themselves be functions of the power level. For example, the slope $b_1(P)$ and the constant $b_0(P)$ may be a functions of the signal strength indicator P. The functions themselves may also be polynomials: $b_1(P)=\beta_{1,1}P+\beta_{1,0}$ and $b_0(P)=\beta_{0,1}(P)+\beta_{0,0}$. Equivalently, the slope and the constant may be given for a reference power level with a linear correction term, i.e. $b_1(P)=\beta'_{1,0}+\beta_{1,1}(P-P_0)$ and $b_0(P)=\beta'_{0,0}+\beta_{0,1}(P-P_0)$, where $P_0$ is a reference value of the signal strength indicator.

Further, the environment parameter may be assumed to be a function of the two measurable quantities. Then a first degree functional relation between the environment parameter and the two measurable quantities would be of the form $T=a_2f_{osc}+a_1P+a_0$. A second degree, two-variable, polynomial would be of the form $T=a_2f_{osc}+a_1P+a0+a_3f_{osc}^2+a_4f_{osc}P+a_5P^2$. Some of the coefficients $a_1$, $a_2$, $a_3$, $a_4$, or $a_5$ may be assumed zero, if experiments reveal that the corresponding term has no significant effect on the value of the environment variable. It is evident for the person skilled in the art that also higher order terms and cross-terms may be included, if necessary. It is also evident, that also other functional form may be used. What has been written for calibrating the remote-access apparatus using two measurable quantities applies equally well for remote-access apparatuses with a sensor. In this case the first measurable quantities may be e.g. $f_{osc}$, TRcal0, $\Delta f_{LF}$, S, or NC.

In case the measured TRcal0' is used to determine the temperature, there are at least two possibilities. First, one may limit the temperature range of the remote-access apparatus, in which case there is a functional relation between T, TRcal0, and P. In this case the calibration data may be generated and used as discussed in case of the other measurable parameter $f_{osc}$. What has been written for calibration concerning one measurable quantity and signal strength indicator as the second measurable quantity is equally applicable in this case where TRcal0' is the first measured quantity. In particular the functional relation T'=h(P',$f_{osc}$) is equally applicable for the other measurable quantity T'=h(P',TRcal0').

In the second case, when temperature range is not limited to a predetermined range, both $f_{osc}$ and TRcal0 may be used to determine the temperature. Moreover, the signal strength P may be used to enhance the accuracy of the measurements.

It is also possible that the accuracy of the selected temperature is enchanced using the measured frequency $f_{osc}$. For example, the frequency can be used to determine another temperature, and this other temperature can be used to enhance the accuracy of the temperature determined using TRcal0'. Moreover, also in this case, the signal strength P may be used to enhance the accuracy of the measurements.

As discussed above, also the link frequency may be used to identify the jump. In this case there might be a functional relation between the temperature and the pair of TRcal0 and link frequency: T=h(TRcal0, $f_{LF}$). The functional relation is not necessarily as simple as in some other cases. However, also in this case there may be a first function H(TRcal0), the function H resulting in a set of possible temperatures for a given TRcal0 value. In addition, the function T=h(TRcal0, $f_{LF}$) might have the form T=h[l(TRcal0,$f_{LF}$),H(TRcal)] meaning that given a link frequency, a TRcal0 value, and a set of possible temperatures, the temperature is determined by first determining the jump index using the function l(TRcal0, $f_{LF}$). The function H may have the form H={T1(TRcal0), T2(TRcal0), T3(TRcal0), ..., Tn(TRcal0)}. At this point reference may be made to FIGS. 7b and 7c, where three temperatures correspond to a value of TRcal0. Each of these temperature functions T1(TRcal0), T2(TRcal0), ..., Tn(TRcal0) may be any function, such as a polynomial function, as discussed above. Therefore the parameters of these polynomials may readily be fitted, once a set of TRcal0' values is measured in known temperatures. The index function l(TRcal0, $f_{LF}$) may covert e.g. some ranges to an index value, the ranges and indexes to be found by calibration. Furthermore, as the link frequency depends on the temperature, it is possible to enhance accuracy with a correction term e, which would depend on the link frequency and the corresponding jump index. Then, the temperature could be determined as T'=h[l(TRcal0',$f_{LF}$),H(TRcal0)]+e[$f_{LF}$,l(TRcal0',$f_{LF}$)]. As an example of the correction term, a reference link frequency $f_{LFR}$ could be determined using the initially determined temperature T'=h[l(TRcal0',$f_{LF}$),H(TRcal0')] and the jump index l(TRcal0',$f_{LF}$), and the correction term e might be proportional to the difference $f_{LFR}-f_{LF}$.

It is also possible that temperature is determined using TRcal0 and the frequency of local oscillator, $f_{osc}$. In this case, there might be a first function H(TRcal0), the function H resulting in a set of possible temperatures for a given TRcal0 value. In addition, the function T=h($f_{osc}$,TRcal0) might have the form T=h[G($f_{osc}$),H(TRcal0)] meaning that given a local frequency and a set of possible temperatures, the temperature is determined. The function H may have the form H={T1(TRcal0), T2(TRcal0), T3(TRcal0), Tn(TRcal0)}. At this point reference may be made to FIGS. 7b and 7c, where three temperatures correspond to a value of TRcal0. Each of these temperature functions T1 (TRcal0), T2(TRcal0), Tn(TRcal0) may be any function, such as a polynomial function, as discussed above. Therefore the parameters of these polynomials may readily be fitted, once a set of TRcal0' values is measured in known temperatures. The function G may be a function relating the frequency to an inaccurate temperature value. The function may be any function, such as a polynomial, and the parameters of the function may be fitted based on the calibration measurements. Finally, the function h may simply choose the value of the components of H that is closest to G, without any calibration.

As discussed above, and with reference to FIG. 7a, it is also possible that the function G results a temperature range [TL, TH]. In this case the function h may choose the value of the component of H that is in the range [TL,TH]. Calibration data in this case comprises the parameters of the functions T1, T2, T3, Tn, and G.

Calibration in the case, where temperature depend on the frequency and the TRcal0 parameter, may also be done with well known curve fitting algorithms. Typically calibration measurements are performed, and some curve, i.e. function, fitted to the calibration measurement data. For example, a number of triplets (TRcal0$_i$';$f_{osc,i}$;T$_i$) may be measured in the calibration measurements, where i is the number of the measurement, TRcal0$_i$' is the value of the TRcal0 variable at which a frequency jump occurs in ith measurement, $f_{osc,i}$ is the value of the value of the frequency of the local oscillator in ith measurement, and T$_i$ is the reference value of the environment variable in ith measurement. It should be emphasized, that T$_i$ is the value of the environment variable in the remote-access device, where the measured quantity is measured.

It is also possible to correct the temperature value using a signal strength indicator. For calibration measurements this means that a number of quadruples (TRcal0$_i$';$f_{osc,i}$;P';T$_i$) may be measured in the calibration measurements, where i is the number of the measurement, TRcal0$_i$' is the value of the TRcal0 variable at which a frequency jump occurs in ith measurement, $f_{osc,i}$ is the value of the value of the frequency of the local oscillator in ith measurement, P' is the value of the value of the signal strength indicator in ith measurement, and T$_i$ is the reference value of the environment variable in ith measurement. It should be emphasized, that T$_i$ is the value of the environment variable in the remote-access device, where the measured quantity is measured.

It is also possible that temperature is determined using TRcal0' and the frequency of local oscillator, $f_{osc}$, as discussed above, and the link frequency $f_{LF}$ is used to enhance the accuracy, as also discussed above. Still further it is possibly to enhance the accuracy using the signal strength. Thus, it is possible to use the measured TRcal0' and the oscillator frequency $f_{osc}$ to determine the temperature, and to enhance the accuracy by both the link frequency $f_{LF}$ and the signal strength indicator P'.

To calibrate the remote-access device and using the signal strength, one may, for example, use the function h as discussed, and correct the temperature with a correction term. The correction term may be e.g. a function e(P) such that T=h($f_{osc}$, TRcal0)+e(P). The correction term may be a function of the signal strength indicator, such as a polynomial function. Moreover, the correction term may be equated to zero at a reference signal strength $P_0$, e.g. such that e(P)=e'(P−$P_0$), where the function e' may be a polynomial with a constant term equal to zero. Calibration data may comprise parameters of the functions h, e, or e'.

In these cases the method for determining the value of an environment variable may comprise:
  obtaining a value ($f_{osc}$, TRcal0', $\Delta f_{LF}$, S', NC') of a first measurable quantity from the raw data, the first measurable quantity being indicative of the environment variable,
  obtaining a value (P') of a signal strength indicator, and
  determining the value of the environment variable is using the calibration data, the value of the first measurable quantity, the value of the second measurable quantity, and the signal strength indicator.

Furthermore, it is possible, that a first part of the calibration measurements is performed in one device and a second part of the calibration measurements is performed in another device. For example the values of the measurable the quantities and the values of the signal strength indicator are measured as function of another variable, such as time t in a first device. The values of the environment variable may be measured as function the another variable in another device. These data may be combined to form calibration information only when needed. Specifically it is possibly to measure first data, e.g.:
  the sets ($f_{osc,i}$;P';t'$_i$) and (t'$_i$;T'$_i$);
  the sets (S'$_i$;P';t'$_i$) and (t'$_i$;T'$_i$);
  the sets (TRcal0';P';t'$_i$) and (t'$_i$;T'$_i$);
  the sets ($\Delta f_{LF,i}$;P';t'$_i$) and (t'$_i$;T'$_i$);
  the sets (TRcal0';$f_{osc}$;t'$_i$) and (t'$_i$;T'$_i$);
  the sets (TRcal0';$f_{osc}$;P';t'$_i$) and (t'$_i$;T'$_i$), and
later use the time information to combine these sets of data to the form that is needed for calibration, such as:
  the triplets ($f_{osc,i}$;P';T'$_i$),
  the triplets (S'$_i$;P';T'$_i$),
  the triplets (TRcal0';P';T'$_i$),
  the triplets ($\Delta f_{LF,i}$;P';T'$_i$),
  the triplet (TRcal0';$f_{osc}$;T'$_i$), or
  the quadruples (TRcal0';$f_{osc}$;P';T'$_i$), respectively.

As seen, from the above, at least two of the variables $\Delta f_{LF}$, TRcal0', S', $f_{osc}$, and P' is measured together with the environment variable T' to obtain calibration data. It is noted the frequency parameter NC could also be measured instead or in addition to some other measurable quantity (the measured value of it being denoted by NC'). It is possible that the first data is combined to form second data only when needed. It is also possible that the different parts of the first data are measured with different devices or systems and stored on different storage devices. E.g. the triplets ($f_{osc,i}$;P';t'$_i$) may be measured with a first system and the values (t'$_i$;T'$_i$) may be measured with another device. These data may be stored on different storage devices. It is further noted, that the value of the measurable quantity may be measured from the remote-access apparatus, while the signal strength indicator may be measured with the reader device.

Calibration measurements may also be divided in the case where calibration measurements a performed with a regulated signal strength.

By these calibration measurement, and possibly using known curve-fitting algorithms, calibration data can be obtained. Calibration data means data that can be used to determine the value of the environmental variable T based on value of at least one measurable quantity. More specifically the value of the environmental variable T may be determined using e.g.:

- at least one measurable quantity, $f'_{osc}$, TRcal0', S', NC', or $\Delta f'_{LF}$; and the signal strength indicator P';
- two measurable quantities $f'_{osc}$ and TRcal0';
- two measurable quantities $\Delta f'_{LF}$ and TRcal0'; or
- any two of the measurable quantities $f'_{osc}$, NC', and S'; or
- one measurable quantity, $f'_{osc}$, TRcal0', S', NC', or $\Delta f'_{LF}$, of which value is measured using a regulated signal strength.

For sake of wording, the signal strength indicator may also be considered a measurable quantity. It is noted the all the quantities $f'_{osc}$, TRcal0', S', NC', and $\Delta f'_{LF}$ are indicative of the environment variable such as temperature. However, the signal strength indicator P' is indicative of measurement conditions of measuring the measurable quantity: the local frequency, $f'_{osc}$, the value of the TRcal variable at which a frequency jump occurs, TRcal0', the height of the frequency jump, $\Delta f'_{LF}$, the output of a sensor, or a frequency parameter.

Furthermore, the accuracy of the environmental variable may be further enhanced by using values of additional measurable quantities in combination with the quantities measured above.

Generally the calibration data may comprise the parameters of any or all the functions described earlier, such as h, H, G, e, e', T1, T2, T3, . . . , Tn, or the calibration data may comprise measured data points such as $(f'_{osc,i};P';T'_i)$, $(TRcal'_i;P';T'_i)$, $(\Delta f'_{LF,i};P';T'_i)$, $(f'_{osc,i};TRcal'_i;T'_i)$, or $(f'_{osc,i};TRcal'_i;P';T'_i)$. Also other data points including $\Delta f'_{LF}$, S', or NC' are possible. Moreover, instead of, or in addition to, the measured data points, the calibration data may comprise representative data points such as $(f''_{osc,i};P'';T''_i)$, $(TRcal''_i;P'';T''_i)$, $(\Delta f''_{LF,i};P';T'_i)$, $(f''_{osc,i};TRcal''_i;T''_i)$, or $(f''_{osc,i};TRcal''_i;P'';T''_i)$. A representative data point, may be for example an average value of several measured data points, i.e. the representative value denoted by two superscripts ' ' may be the average of several measured values, denoted by one superscript. Specifically, if many similar remote-access apparatuses are calibrated at the same time, it may be feasible to use the average value of the quantity in a specified temperature for forming calibration data. Other possibilities are to generate several representative data points from a single data point. In this way some data point may be weighed when forming calibration data. For example, data point close the expected use environment may be give more weight in the calibration than data point far away from expected environment. Furthermore, the calibration data may comprise the identity of the remote-access apparatus to which the calibration data is applicable.

In some embodiments partial calibration data is measured and stored in the remote-access device, in another remote-access device, in the reader device or in an external memory. Partial calibration data is here defined, on one hand, as data comprising the values of at least two of the measurable quantities, (TRcal0', $f'_{osc}$, $\Delta f'_{LF}$, S', NC', P', $f'_{LF}$) at some instances of time or in some locations. Partial calibration data is here defined, on the other hand, as data comprising the values of the environment variable $T'_i$ at some instances of time or in some locations. Preferable the times or locations are the same or almost the same so that the time or location information can be used to associate the measured values of the measurable quantities and the environment variable with each other. In order to form calibration data, partial calibration data needs to be combined with other partial calibration data. More specifically, a value of the environment variable needs to be associated with the corresponding value of the measured quantity and signal strength indicator, e.g. by using the measuring times. Partial calibration data comprising e.g. the values of $f'_{osc,i}$ and P' at some instances of time or in some locations may be measured e.g. in a first system such as a remote-access apparatus and an RFID reader device. The partial calibration data comprising the values of the environment variable $T'_i$ at some instances of time or in some locations may be measured in a second device, such as a data logger. Moreover, the combination of these partial data may be done in either of these devices, or in a third device, such as a computer. After the values $f'_{osc,i}$ and P' are associated with corresponding values $T'_i$, also other calibration data, such as parameters of a function, may be formed.

The calibration data can be used to determine the value of the environment variable T based on the measurement of a at least two of the measurable quantities (TRcal0, $f_{osc}$, $\Delta f_{LF}$, P, $f_{LF}$, S and NC). Methods for determining the environment variable T from at least two measurable quantities were discussed above.

Furthermore, It is possible, that all or some of the values or representative values of calibration measurements, e.g. $(f'_{osc,i};P';T'_i)$ or $(f''_{osc,i};P'';T''_i)$, form a two-dimensional lookup table that is used as h. Thus, the temperature could be looked up from that table, e.g. first for corresponding signal strength indicator (row) and second for corresponding value of measurable quantity (column), from which the corresponding value of the environment variable T' may be obtained. In case an exact match is not found, the environment variable can be interpolated or extrapolated using e.g. the four data points that are closest to the measured $f'_{osc}$ and P' with respect to the values in the two-dimensional lookup table.

Calibration can be done for each remote-access apparatus individually, or calibration can be made for a set of similar remote-access apparatuses. In the former case, calibration measurements are performed for one remote-access apparatus, and the calibration data concerns only that apparatus. In the latter case, the same calibration data, e.g. parameters of a function, may be used for a number of remote-access apparatuses. The calibration data may be obtained by measuring many remote-access apparatuses in the calibration measurements, and forming calibration data based on all the measured data. It is also possible, that the calibration data is used for a remote-access apparatus that has not actually taken part in calibration measurements. E.g. in case the RFID chip is from the same family, it may be possible to rely on calibration measurements on similar apparatuses.

In case a set of remote apparatuses is calibrated, it is possible to form calibration data such that part of the calibration data concerns a set of remote-access apparatuses and part of the data concerns the individual apparatus. For example if the calibration measurements are be done for a set of remote-access apparatuses, the calibration data thus obtained will be applicable to the set of remote-access apparatuses. However, calibration data may also comprise correction terms for individual remote-access apparatuses. For example, the coefficients $a_2$, $a_1$, and $a_0$, of the first degree polynomial $T=a_2 f_{osc}+a_1 P+a_0$, may be the same for all remote-access apparatuses having an RFID chip of the same family, but in addition, calibration data may comprise a correction term $a'_2$, $a'_1$, or $a'_0$ indicative of the offset of the individual remote-access apparatus in relation to the set of apparatuses. Thus, for example, the temperature for an individual remote-access apparatus could be determined as $T=(a_2+a'_2)f_{osc}+(a_1+a'_1)P+(a_0+a'_0)$. In case some of these may be considered zero, and approximation $T=a_2 f_{osc}+a_1 P+(a_0+a'_0)$, may be used. Here only the correction term $a'_0$ needs to be known for each individual remote-access apparatus, while the coefficients $a_2$, $a_1$, and $a_0$, may be found from calibration measurements of a set of remote-access apparatuses, and are therefore applicable to a set of remote-access apparatuses. This allows, for example, a remote-access apparatus to contain information indicative of the correction term, and a reader device to contain information of the other coefficients. Alternatively, a remote-access apparatus may contain the value of the constant term, i.e. $a_0+a'_0$, while the information on the slopes $a_1$ and $a_2$ may be stored in a reader device.

Thus, the calibration data may be divided to at least two parts, and the parts may be stored on different storage devices. Therefore, the memory requirements for the remote-access apparatus are relatively small. Moreover, some typical values for the correction term may be coded in a table so that these values can be pointed with a piece of data that is stored in the tag. The tag may, as an example, contain a 8-bit integer, which is indicative of the value of the correction term. The reader device can then deduce the coefficient based on the RFID chip family, and obtain a value for the constant from a table using this 8-bit integer.

The calibration data may be stored in the remote-access device, or it may be stored in another remote-access device. Furthermore, the calibration data may be stored in the RFID reader device, in a detachable memory card used in connection with the reader device, in an external server, or the data may be stored partly in some or all of the previous, including the remote-access apparatuses. For example, a correction term may be stored on the remote-access apparatus, while the other calibration data may be stored in the reader device, or in a server arranged to communicate with the reader device.

In order to store the calibration data, the calibration data may be sent to the corresponding device. For example, an RFID reader device, equipped to directly measure or receive information on the value of the environment variable, may form the calibration data, and send it or part of it to a remote-access device or several remote-access devices, an information server, or it may even send it to a storage part of itself, such as a memory chip or a memory card, for information storing purposes. Once formed and stored, the calibration data may be sold, e.g. on a memory card or from an internet server.

Some aspects of calibration are the functional form of h, H, G, e, e', T1, T2, T3, . . . , and Tn, and the calibration temperatures $T_i$. Generally the dependence between the temperature and the measurable quantities is not linear. However, to some accuracy, the relationship can be estimated to be linear in some cases.

As for the calibration temperatures, calibration measurements are preferably made during a typical life cycle of the remote-access apparatus, i.e. not as separate measurements in a laboratory, where calibration measurements are often done. For calibration, several different calibration points should be used, and in case of temperature, measurements should be done in several different temperatures.

Some points for calibration measurements may be available when testing the RFID chips, when bonding the chips to the substrate to form the inlay, when manufacturing an RFID tag using the inlay, or afterwards while using the remote-access apparatus. To describe some embodiments of the calibration process, one needs to understand the RFID chip manufacturing process, the chip-to-substrate bonding process, and the tag manufacturing process. For economical purposes one efficient way is to find and use useful calibration points from the normal life cycle of a remote-access apparatus. In contrast, calibration measurements could be done in a laboratory or an office, but this would require separate calibration steps in the manufacturing process. In case calibration process can be integrated in normal life cycle of a remote-access device, time may be saved. The life cycle may comprise manufacturing, transportation, and commercial use, as an example. The device for performing calibration measurement may be a handheld reader device, or it may be an integral part of some apparatus used to handle goods or other objects comprising remote-control apparatuses. It may be possible to measure the temperature and the frequency of local oscillator at the same time from several remote-access apparatuses. In particular, the reader device may be an integral part of at least one of the following: a platform for objects, a pallet for objects, a vehicle, a shelf in a warehouse, a forklift used in the warehouse, a shelf in a store, a bonding apparatus, an oven, or a reflow oven, and a temperature sensor may be arranged in connection with the reader device in order to send the reference temperature value to the reader device.

Typically the measurements are more accurate in case the value of the environment variable is interpolated, than when it needs to be extrapolated. Thus, the at least one value of the environment variable used in calibration measurements should be larger than what is expected in typical measurements, and at least one value of the environment variable used in calibration measurements should be smaller than what is expected in typical measurements. When manufacturing tags, one step in the process is the bonding of an RFID chip to a substrate. Typically the chip may be solder-bonded to the substrate, or bonded with an adhesive, such as non-conductive, anisotropically conductive or isotropically conductive adhesive. Both solder-bonding and adhesive-bonding are bonding processes. For remote-access apparatuses, it is more common to use adhesive bonding, but in principle also solder bonding is possible.

In case the chip is solder-boned to substrate, the chip is heated above the melting point of the solder and the solder melts. The input and output pads of the chip are usually bumped with bumps of solder before the chip is heated. The chip is the made in contact with the substrate such that the melt solder forms a galvanic contact with the substrate. Thereafter the chip and the substrate are allowed to cool below the solidifying temperature of the solder. Common solder include the Sn—Pb, Au—Sn, Bi—Sn and In—Sn. The melting points of these solders are approximately 183° C., 280° C., 138° C., 118° C., and the melting point may slightly differ from the solidifying point. Also the ternary Sn—Ag—Cu with the melting point of 217° C. is becoming increasingly popular. Also other than eutectic/ternary mixtures may be used, and other solders, as well. As soon as the chip forms a galvanic contact with the substrate, the RFID tag may be operated. Thus calibration measurements can be made at the solidifying temperature of the solder and also during cooling. After the bonding process the tags are typically cooled to room temperature in a post-bonding cooling process. Therefore, in a solder-bonding process environment, the temperature is around 100-300° C., and it may be possible to make calibration measurements in this temperature range. In the post-bonding process environment, the temperature decreases from around 200° C. to around 20° C., and calibration measurements for the remote-access devices can be made in this temperature range. The post-bonding cooling process may last some minutes, which is a relatively short time. Temperature of the remote-access apparatus can be measured e.g. by using an thermal imaging camera capable of determining temperature based on the radiation. In case the post bonding process is much slower, a thermometer for measuring the ambient temperature could be used, since the process could be assumed stationary. However, a slow cooling process is not economical. Alternatively to measuring the temperature, one can measure only the two measurable quantities as a function of time t, i.e. the measure e.g. the values (TRcal0'; $f'_{osc,i}$;$t'_i$) and only later provide the information on the temperature at those instances of time, i.e. the pairs ($t'_i$,$T'_i$)).

In case an adhesive is used to bond the chip to the substrate, pressure or temperature or both may need to be applied to chip to form a contact or to cure the adhesive. The system is kept in these conditions for a period of a curing time. In addition, the temperature of the chip may be initially raised to a prebonding temperature. In some cases, an electric contact may be formed already in the pre-bonding process, and in such case, calibration measurements may be done in the pre-bonding process. In case only temperature is applied, calibration data may be measured as described above. In case both temperature and pressure are applied, and the measured quantity is only weakly dependent on pressure, calibration data on temperature may be measured. In case pressure is applied, and pressure changes the measured quantity, calibration data for pressure measurements may be obtained. Calibration measurements may in some cases also be done between the pre-bonding and adhesive-bonding processes. The phase between pre-bonding and bonding is called bonding transition phase. In the bonding transition phase, the temperature of the RFID inlay is relatively high, and no pressure is applied. Typical pre-bonding temperature for adhesives are in the range of 70-90° C., typical adhesive-bonding temperatures in the range of 150-230° C., typical bonding pressures in the range of 100 kPa-100 MPa, and typical curing time 5-30 s. After bonding, in the post-bonding process the remote-access device is cooled to room temperature. The post-bonding cooling process may last about 15-20 s, which is a relatively short time. Temperature of the remote-access apparatus can be measured e.g. by using an thermal imaging camera capable of determining temperature based on the radiation. Therefore, several measurements may be made during the cooling period in the approximate range of 20° C.-230° C. Moreover, since the temperature decreases exponentially to room ambient temperature, more calibration measurements are made close to room temperature than in higher temperatures, in case a constant time delay between calibration measurements is used. Temperature of the remote-access apparatus can be measured e.g. by using an thermal imaging camera capable of determining temperature based on the radiation. By a thermal image camera, the temperature of multiple remote-access apparatuses may be determined from one image. Typically, the thermal image camera may take a picture of the web, on which the inlays lie, and from the color of the RFID chips, the temperature of each RFID chip may be determined. Therefore calibration measurement of several RFID inlays in several temperatures during the cooling process. Even if this process takes about 15-20 s, it is emphasized, that these calibration measurements do not slow down the manufacturing process. In case the post bonding process is much slower, a thermometer for measuring the ambient temperature could be used, since the process could be assumed stationary. Moreover, a thermocouple may be bonded to a RFID chip to monitor the temperature during bonding, pre-bonding or post-bonding process. However, a slow cooling process is not economical. In some cases a reasonably accurate calibration may be obtained by assuming a known temperature decrement in the cooling phase, which information may have been obtained from previous measurements. Calibration data may be obtained from the measured data, e.g. ($P'_i$; $f'_{osc,i}$;$T'_i$). Alternatively, the values $f'_{osc,i}$ and $T'_i$ may be measured at certain instances $t'_i$ of time, and calibration data may be formed by combining these partial calibration data.

Both solder and adhesive bonding may be done as a reel-to-reel process. In such a process, a large number of flexible substrates is stored on a reel. The substrates may form a matrix, i.e. several substrates may be located in the reel in rows and in columns. When the RFID chip are bonded to the substrates to form the inlays, the reel is unwound, and the chips are bonded to the substrates. Finally the bonded inlays be winded to a roll. The bonding process may be preceded by a pre-bonding step. This process is schematically shown in FIGS. 8a and 8b.

Figure 8A:
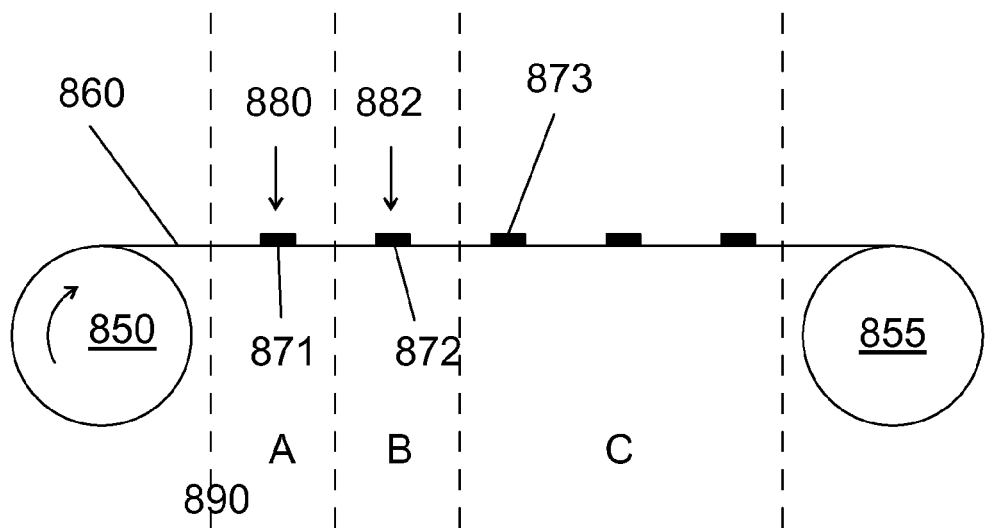
FIG. 8a shows schematically a side view of a chip-bonding process.
Figure 8B:
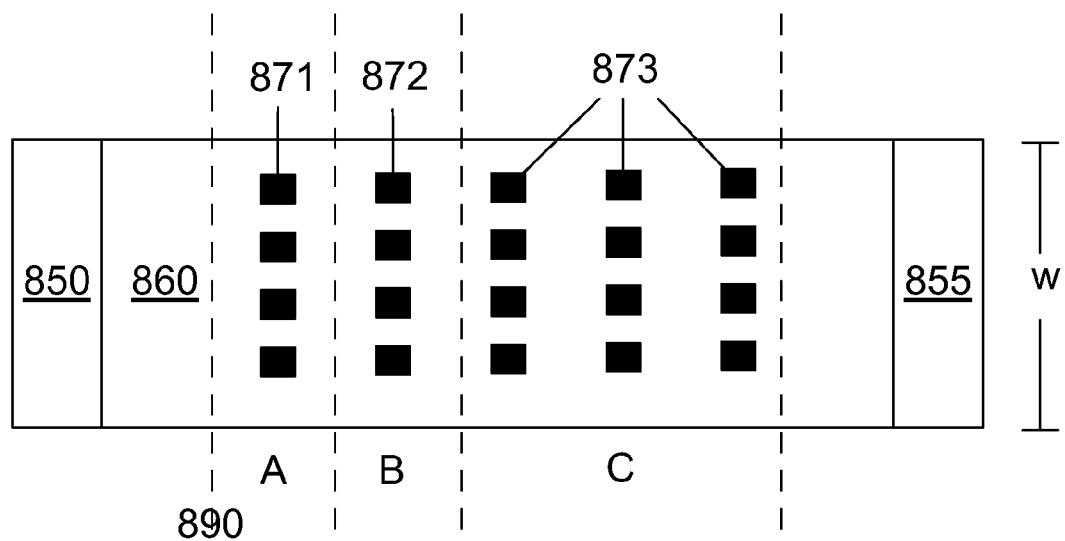
FIG. 8b shows schematically a top view of a chip-bonding process.

FIG. 8a is a side view of a reel-to-reel bonding process. The substrates, which comprise the antenna, are manufactured, e.g. on a matrix form, on a web 860. The web is stored on a first reel 850. When the RFID chips 871, 872, 873 are bonded to the substrates, the first reel is unwound. The direction of rotation of the reel is shown with an arrow. As the web advances, the substrates enter first a pre-bonding area A, in which the RFID chips 871 are attached to the substrate, and some pre-bonding pressure and temperature may be applied 880 to chip. In the pre-bonding stage some adhesive may be applied in between the chip and the substrate. Next the substrates with the pre-bonded chip arrive to bonding phase B. There the bonding pressure and temperature are applied 882 to the chip. The chips are in the bonding transition phase, when moving from the pre-bonding phase A to the bonding phase B. Finally the inlays enter the post-bonding cooling phase C. Chips in this area are shown with the number 873. Typically in the post-bonding phase no pressure or temperature is being applied; only the normal room temperature and pressure affect the inlays. The different phases are separated with dotted lines 890. In the solder-bonding process the pre-bonding phase is not needed. FIG. 8b is a top view of the web and the chips. The width of the web, w, may be, as an example, about 200-500 mm, while the width of a substrate may be, as an example, about 20-150 mm, depending on the substrate and its orientation of the web. As an example, the size of the RFID chip may be around 0.5-1 mm in all three dimensions.

The chips for the tags may be manufactured and/or programmed by one entity. In this entity, a silicon wafer comprising multiple RFID chips is processed. Typically the chips (i.e. dies) are tested with probes to find out, which chips are known to be good (known-good-die, KGD). These probes are typically part of a probe station, and the probes may form an electrically conductive path through the input/output pads of the dies, from the probe station to the dies. It may be possible, to measure the measurable quantities as a function of the environment variable already on wafer level, i.e. after manufacturing the wafer, but before sawing the wafer into chips. If might be possible to do these calibration measurements also after the sawing process, i.e. for single dies. Therefore, some calibration measurement may be may in the chip factory, in the wafer-handling environment, and some calibration measurements may be done in the chip factory, in the chip-handling environment.

When the chip is bonded to the substrate, the inlay is formed. To make up an RFID tag or other remote-access apparatus, the inlay may be attached a tag perform or other object. Some calibration measurement may also be done while manufacturing the tag. Temperatures in this process are typically close to room temperature.

After the tag manufacturing process, the remote-access device is brought into service. Typical application of remote-access apparatuses are in logistics and commerce. A transportation vehicle may comprise a reader device that is configured to make calibration measurements. Therefore, some calibration measurements may be done in the vehicle. Naturally, also other measurements can be done in the vehicle during transportation. It should be emphasized, that measurements of the value of the quantity can be made even if the remote-access apparatuses are not calibrated. After the transportation, the remote-access devices might be located in a store, i.e. warehouse or a commercial store. A reader device may be installed in the store to make calibration measurements or other measurements. In order to be able to make calibration measurements, the value of the environment variable needs to be known from other, direct, measurements. It may be possible to form calibration data in these locations, i.e. perform calibration measurements as discussed above. In some cases, e.g. if the temperature of a warehouse is stabilized, it may be possible to form partial calibration data based on location information. Denoting the location by r, it may be possible that partial calibration information comprises the measured values of the quantities and the variable r, i.e. (P', $f'_{osc}$,r'), and since the temperature of the warehouse is stabilized, the other partial calibration information (T',r') is known. In case the remote-access apparatus travel through a number of places, the location information, r, may possible be stored as information indicative of the location, in which the calibration measurement was done, such an integer number corresponding to a specific warehouse.

Calibration can be done either incrementally or in a single run, and also only partial calibration data can be measured. In an incremental calibration, the reader device requests old calibration data and measures the value of the quantity using a remote-access apparatus. The old calibration data can be stored in the remote-access apparatus, the reader, a memory card or in a external server. The reader device then uses this information to generate new, possibly more accurate, calibration data. New data may comprise the measured value and the time or location of measurement, or the new data may comprise the measured value and the corresponding value of the environment variable. Furthermore the new data may comprise, when applicable, any or several of: the identity of the remote-access device, the time, the location, and the value of the environment variable. In order to be stored, the new calibration data is sent. It may be sent to the remote-access apparatus, to another remote-access apparatus, the memory of the reader device, a memory card, or an external server, or to many of the previous. Furthermore, different parts of the new data may be sent to different entities. The existing calibration information may be e.g. all the measured (P'$_i$,f'$_{osc,i}$,t'$_i$; T'$_i$) values, and the new calibration information may be this with an added, most recent triplet. Some calibration data may also be removed. It is also possible to weigh the calibration measurements such that the recent calibration measurement results are give more weight than the older results. Thus, in the determination of the value of the environment variable, the most recent known values are given more weight than the older values. Moreover, it is possible to weight the calibration measurement results such that more weight is given to measurements that are done near the probable use conditions. E.g. more weight can be given to measurements near the room temperature than to measurements near the bonding temperature. Apart from calibration measurements, measurements may be formed using only the old calibrations data. In this case the new calibration data is not formed.

When calibration is done in a single run, several values of P', f'$_{osc,i}$ and T'$_i$ are measured, and calibration data generated based on these measurements. The calibration data may be stored in the remote-access device or another remote-access device, in the RFID reader device, in an external server, or the data may be stored partly in some or all of the previous. Moreover, a tag may contain the calibration data of another tag or the calibration data of several other tags.

Calibration can be done based on partial calibration data, when in the calibration measurements the values of the measurable quantities and times t'$_i$ or locations r$_i$ are stored. The remote-access device, the RFID reader device, or an external server, or any combination of these, may be used to store the data. Separately from these measurements, the calibration temperatures T'$_i$ at these times or in these locations are measured. It is also possible, that the temperatures are not measured exactly at the times t'$_{i,}$. In such case the temperature can be measured at different times, and linear or other interpolation technique(s) may be used to deduce the temperature at the times t'$_i$. These results may also be stored to a remote-access apparatus, an RFID reader device, a memory card, an external server, or any combination of these. By using the corresponding times or locations, the values of the measured quantity can be associated with the values of the environment variable to obtain the data points, e.g. (P';f'$_{osc,i}$;T'$_i$) or the representative data points. In case calibration is done on environment variable, after sufficient amount of calibration measurements, the parameters of the functions or some other calibration data may stored in the remote-access device, on a memory card, in the RFID reader device, in an external server, or in any combination of the previous. In case the same coefficients are used for a set of remote-access apparatuses, a single measurement can reveal an estimate for the correction term a'$_0$.

The calibration data can be used to determine the value of the environment variable based on a measured quantity. For example, once calibrated, the temperature of a remote-access apparatus can be determined based on at least two of the quantities: the frequency of the local oscillator, the TRcal0 value, the height of the frequency jump, the output of a sensor, the frequency parameter, and the signal strength indicator. Alternatively, once calibrated with measurements using a regulated signal strength, the temperature of a remote-access apparatus can be determined based on a measured value of one the quantities: the frequency of the local oscillator, the TRcal0 value, the height of the frequency jump, the frequency parameter, and the output of a sensor using the regulated signal strength. Furthermore, in case calibration measurements are done using a regulated signal strength, a signal strength indicator may be used to enhance the accuracy. This information can be used e.g. to show the temperature on reader device's display or on the tag's display. The value of the environment variable is often needed at the time the measurement is made, i.e. the calibration can be preferably be done before the measurements. However, the measurable quantities, such as the frequency, can be measured even without calibration. Therefore, these quantities can be measured first in a first environment with a remote-access apparatus, e.g. during transportation, without correlating them with the environment variable. The values of the quantities may be stored e.g. on the remote-access device or an external server. Furthermore, if needed, after the transportation, temperature during transportation can be deduced using calibration data. The temperatures can be deduced much later or in another environment, an analysis environment, such as an office or a laboratory. The measured values of the measurable quantities can be provided for the analysis over an interface, for example on internet interface, an interface of the reader device or by using a memory card as the interface. This also means that the reader device may be transferable in relation to the device, where the data is analyzed. The calibration data, if calibration has been done for the corresponding chip family or the corresponding remote-access device, may be obtained from a server, or ordered on a memory card, after the transportation. The information may also be priced, and used only on need-to-know basis. Alternatively, the tag from the interesting transportation together with the frequency measurement results can be later sent to a service provider for making calibration measurements and doing analysis to determine the temperatures during transportation. The frequency measurement results may have been stored on the device itself, or they may have been stored on a server, memory card, or the reader device.

Moreover, a re-calibration may be done for a tag that has been in use for some time. Also, an already calibrated first remote-access device can be used to make calibration measurements. That is, once the first remote-access device has been calibrated, it can be used to make accurate measurements of the environment variable. Therefore, when calibrating a second remote-access device, a reader device may determine the value of the environment variable using the first remote-access device, and to generate calibration data regarding the second remote-access device, also measure the value of the measurable quantities from the second remote-access device. Calibration data regarding the second remote-access device can then be generated as discussed above. In case temperature is measured, a reader device may comprise a temperature sensor such as a thermal image camera, a thermocouple, or a thermometer for the ambient temperature.

Figure 9:
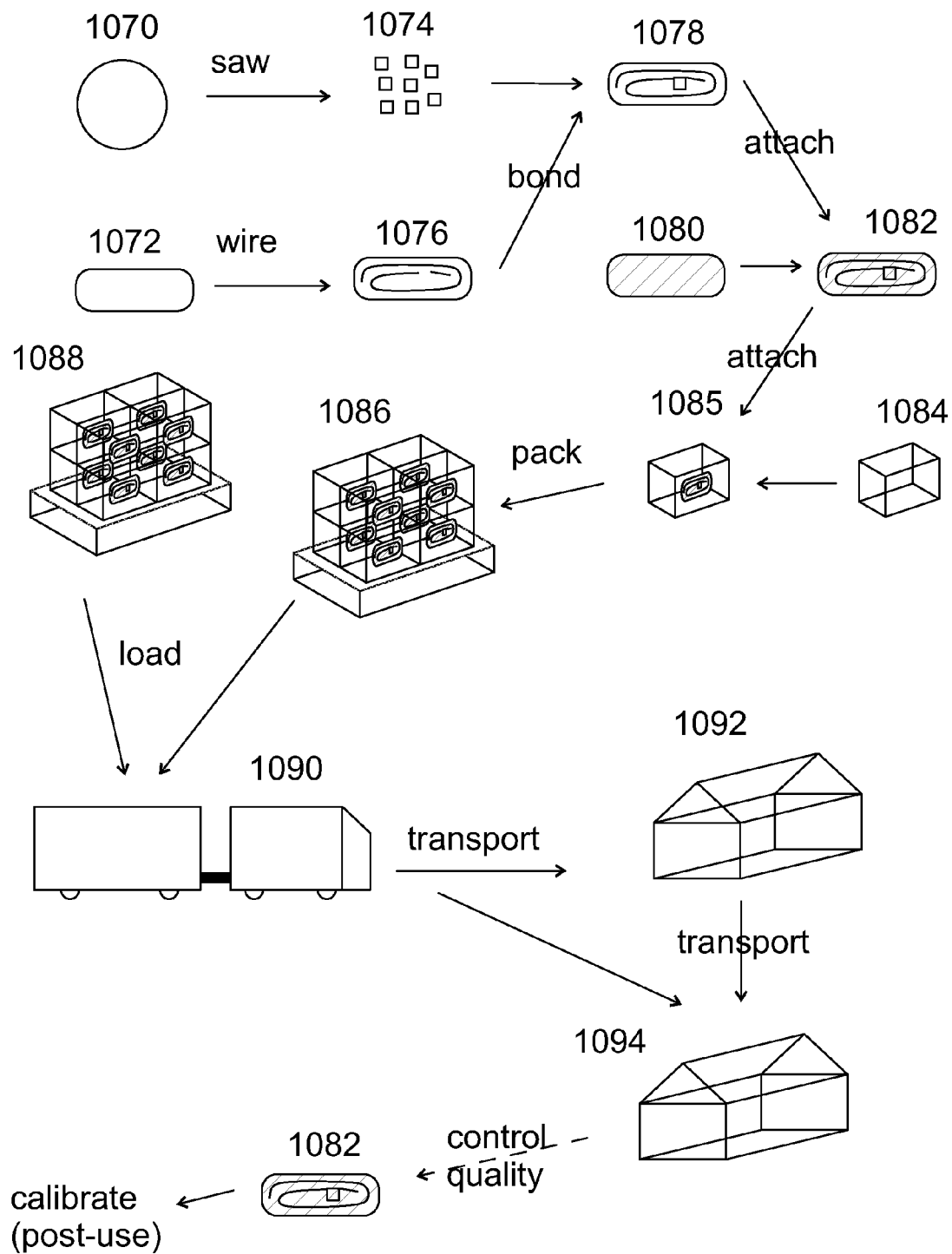
FIG. 9 shows schematically a part of an example life cycle of a remote-access apparatus.

FIG. 9 shows some phases of a life cycle of a remote-access apparatus. The wafer 1070 comprising RFID chips 1074 is manufactured in a wafer factory. After the wafer has been manufactured, it is sawed to RFID chips. A wafer may comprise tens of thousands of RFID chips; a large 12-inch wafer may comprise a hundred thousand chips. Calibration measurements may be performed for the wafer of for the chips. The substrate 1076 comprising a film 1072 is made by processing a conductive wiring onto the film. A chip is bonded to a substrate to make up an RFID inlay 1078. Bonding process in itself has several points, in which calibration can be done, as discussed above. The inlay is attached to a tag perform 1080 to make an RFID tag 1082 or a remote-access device. The tag 1082 may be attached to a product 1084 to make up a traceable product 1085. Several of such objects may be packed on to a pallet 1086. For transportation, such pallets 1086, 1088 may be loaded into a vehicle 1090. Finally, the pallets are transported to a warehouse 1092 or a store 1094. The pallet may also be transported from a warehouse to a store. Other points for making calibration measurements include right after packing, e.g. when the products are on the pallet. The pallet itself may include a calibration device. Furthermore, a calibration device may be located or integrated in the vehicle 1090, and calibration measurements may be done during transportation. The pallets are transported to a warehouse or directly to a store. In the store, the pallets are unpacked, and the products are made for sale. Both the warehouse and the store may include natural places or devices for calibration measurements, such as shelves, forklifts, carts, or conveyor belts. Naturally, these phases can also be used to monitor the value of the environment variable, if calibration has been performed. In addition, these phases can be used to record values for the measurable quantity, and later determine the corresponding temperatures by using calibration data. Furthermore, some of these phases can be used to record values for the measurable quantity, and later combine the results with the corresponding value of the environment variable to form calibration data. Information on time or location may be used to associate the corresponding variables.

Furthermore, quality control may reveal in any phase of the life cycle that the item has become unusable. Therefore, it may be possible to send the remote-access apparatus for calibration after the fault has been noticed. In an embodiment, the values of the measurable quantity are measured without calibration, and only when the quality controls reveals a fault, the remote-access apparatus is calibrated, and the recorded raw data is used to solve the value of the environment variable, e.g. the temperature, in which the item has been.

Various operators in the life cycle may also offer calibration services during their operations. For example, a transporter may offer transportation in a accurately controlled temperature. Therefore calibration data can be obtained during transportation. Moreover, if several data points are needed, the transporter may offer transportation in several given temperatures for a given time, e.g. the temperature can be kept at 1, 3, and 5 degrees C. for a given period of time during transportation. Similarly, the warehouse or parts of the warehouse can be equipped with accurate temperature control for performing calibration measurement in the warehouse. Furthermore, the items may be stored in such a warehouse before transportation as single items or on pallets (not shown in FIG. 9).

Figure 10:
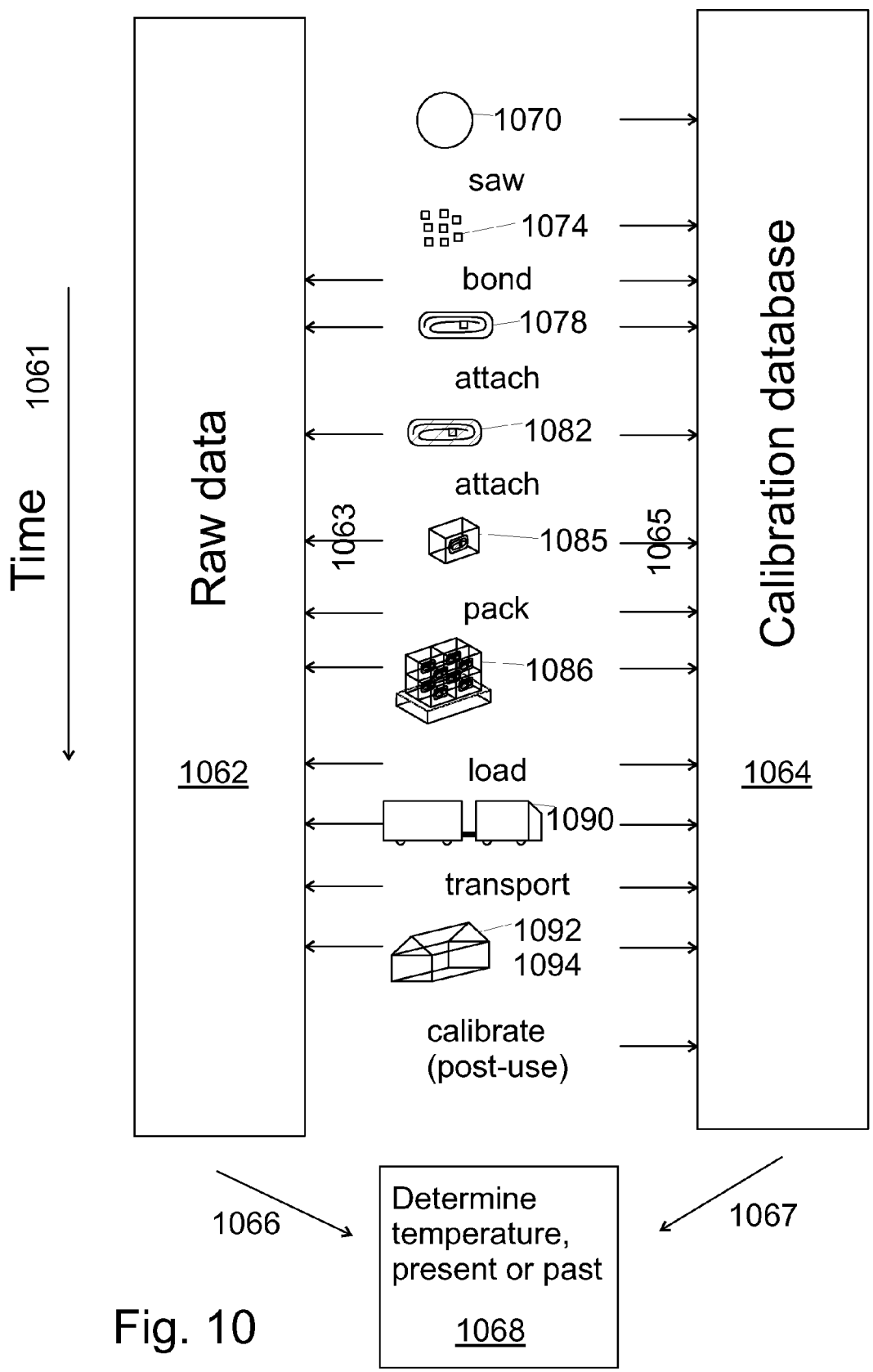
FIG. 10 shows schematically a method of collecting raw data and calibration data using a remote-access apparatus during its life cycle, and a method of determining temperature using collected data.

FIG. 10 illustrates the processes of collecting raw data and calibration data and their combination to obtain temperature values. In FIG. 10 the life cycle of the remote-access apparatus, as shown in FIG. 9 from the wafer 1070 to the store 1094 or warehouse 1092, is reproduced in the middle. The evolution of time is shown with the arrow 1061. During the life cycle, raw data 1062 may be collected. The collection of raw data is represented with arrows 1063. Raw data comprises the values of the measurable quantities and may comprise the identity of a remote-access apparatus associated with the value. Raw data may also comprise also information indicative of time and/or location is which raw data was measured. Furthermore, raw data may comprise the values of the measurable quantities for a second remote-access apparatus or a multiple of remote-access apparatuses. It may also contain the identities of the other remote-access apparatuses. Raw data may be stored for example to the remote-access apparatus, another remote-access apparatus, internal memory of a reader device, a detachable memory card on the device, or an external information server.

In addition to raw data 1062, calibration data 1064 may be collected during the life cycle of the remote-access apparatus. The collection of calibration data is shown with the arrows 1065. The calibration data comprises also reference values for the value of the environment variable, e.g. temperature. Calibration data may be collected as partial calibration data, which are later combined to form calibration data. For example, the frequency of local oscillator as function time may be measured with a first data logger, and the temperature as a function of time with a second data logger. These data may be combined to produce calibration data.

As soon as calibration data is formed and raw data measured, raw data may be sent 1056 and calibration data may be sent 1067 to determine 1068 the value of the environment variable, e.g. temperature. In an embodiment, calibration data is measured first, and raw data may be converted to a temperature value as soon as it is measured. For example, if the temperature of an item is to be measured, data regarding the item can be measured only after the remote-access apparatus has been attached to the item 1085. However, calibration data may be measured form the wafer 1070, chips 1074, the inlay 1078, or from the tag 1080, e.g. in the bonding process (FIG. 10 "bond"). In another embodiment, raw data is measured first, and calibration data is measured only when needed. In FIG. 10 this is depicted with the label "calibrate (post-use)", meaning that some remote-access apparatuses may be sent for calibration after the typical use, e.g. because quality control reveals a reduced quality for the item. Then the information regarding the environment for the item can be determined afterwards. Raw data can be stored on a device and it may be accessible over an interface.

In an embodiment, the calibration data forms a database that comprises the identity of at least one remote-access apparatus and the calibration data associated with that remote-access apparatus. In a preferred embodiment, the database comprises calibration data of several remote-access apparatuses associated with the corresponding identity. Then, when the raw data comprises the identity of the remote-access apparatus and the values of at least two measurable quantities, this calibration database can be used to determine the corresponding temperature. The database can be used e.g. such that the both the values of P' and $f_{osc}$' of the measurable quantities and the identity of the remote-access apparatus is received from the remote-access apparatus. Using this identity, the corresponding calibration data may be obtained from the database. Finally, using the obtained calibration data and a values P' and $f_{osc}$', the temperature T' may be obtained, e.g. using a function h such that T'=h(P',$f_{osc}$'). It is reminded that any of the quantities TRcal0', S', NC', and $\Delta f_{LF}$ may here be substituted for $f_{osc}$'. Moreover, as discussed above, also more than two measurable quantities may be used to determine the temperature, e.g. P', $f_{osc}$', and TRcal0'. Still further, even only one value of a measurable quantity may be used, if the signal strength in the measurements is regulated to the same level in calibration measurements and other measurements.

The database can also be distributed. For example a part of the database can be stored in an external database, a part in a remote-access apparatus, and a part in the reader device. Furthermore, the database can be distributed to several remote-access apparatuses. In case the calibration data is stored to the remote-access apparatus that is used for measurements, the identity of the remote-access apparatus is not necessarily needed to obtain calibration data.

Information from the database can be given or sold to a user on allowed to know-basis. For example, calibration data regarding a remote-access apparatuses for a chip family can be cheap, while the more accurate calibration data concerning a specific remote-access apparatus can be more expensive. Most accurate data calibration data obtained in laboratory conditions after a decrement in quality has been observed may be provided as a service, and may be even more expensive. The calibration database can be updated by doing calibration measurements and storing the identity of a remote-access apparatus together with the corresponding calibration data to the database. In an embodiment, the database is distributed to remote-access apparatuses such that each apparatus comprises its calibration data. Thus, in an embodiment, the identity is not stored. Initially an empty database may be formed without measurements, and the first calibration data may be added to the empty database. The database may be in the form of a computer product. It may be stored on a computer readable device, such as a memory chip (e.g. of a memory stick, a memory card, or of a computer), an optical storage media (such as a compact disc, CD, a digital video disc, DVD, or a printed database), or a magnetic storage media (such as a magnetic disc, e.g. a hard drive, or a magnetic tape).

Moreover, the database can be made accessible for a user only with an access code. Thus, only authorized users may have access to the database. The access code may be indicative of the access type: The database user may have full access, i.e. read and write access, to the database, a user may have full read access to the database, i.e. the user may read the calibration data of a single remote-access apparatus from database, or a user may have limited read access to the database, i.e. the user may only obtain some statistical values of the calibration data such as mean values of the parameters of a function, the mean regarding e.g. a chip family.

When determining the value of the environment variable, calibration data is needed. Calibration data can be requested from an entity, and the entity may be a database comprising calibration data, or it may be a service provider that performs the calibration measurements by request and deduces the calibration data based on those measurements. In an embodiment, the raw data measured with a remote-access apparatus and the corresponding remote-access apparatus may be sent to a service provider to determine the corresponding values of the environment variable, e.g. temperature. In this case, the service provider receives the raw data, and may request calibration data either from a database or from a calibration data measuring device, i.e. calibration device. The calibration device may comprise an RFID reader device and means to measure a reference temperature, and may send e.g. the data points of calibration measurements or the parameters of a calibration function to the service provider. The service provider may then determine the value of the environment variable using the raw data on the calibration data.

The various embodiments of the invention can be implemented with the help of computer program code that resides in a memory and causes the relevant apparatuses to carry out the invention. For example, a tag, a chip or a reader device may comprise circuitry and electronics for handling, receiving and transmitting data, computer program code in a memory, and a processor that, when running the computer program code, causes the reader device to carry out the features of an embodiment. Alternatively or in addition, a tag or a chip for a tag or a reader device may comprise logic circuitry for implementing the same functionality as may be carried out by means of program code run on a processor. Yet further, a network device may comprise circuitry and electronics for handling, receiving and transmitting data, computer program code in a memory, and a processor that, when running the computer program code, causes the network device to carry out the features of an embodiment. A system may comprise any number of tags of the same kind or different kinds, and reader devices and network computers in any combination.

The following examples summarize some features of the embodiments:

Example 1

A method for determining the value of an environment variable (T') using raw data from a remote-access apparatus, the remote-access apparatus being energetically essentially passive, the method including:

obtaining a value ($f_{osc}$',TRcal0',$\Delta f_{LF}$,S',NC') of a first measurable quantity from the raw data, the first measurable quantity being indicative of the environment variable, obtaining a value (TRcal0',$\Delta F_{LF}$,$f_{osc}$',$f_{LF}$,P') of a second measurable quantity, the second measurable quantity being indicative of the environment variable or the measurement conditions of the first measurable quantity, and determining the value of the environment variable using calibration data, the value of the first measurable quantity, and the value of the second measurable quantity.

Example 2

The method of example 1, wherein
the first measurable quantity is the value of a TRcal parameter, at which a frequency jump occurs (TRcal0') and the second measurable quantity is one of: a frequency of a local oscillator ($f_{osc}$) a backscattering frequency ($f_{LF}$), and a height of a frequency jump ($\Delta f_{LF}$).

Example 3

The method of example 2 further including obtaining a value (P') of a signal strength indicator, wherein the signal strength indicator is one of:
an indicator of the signal strength at the remote-access apparatus,
an RSSI parameter of the reader device,
a power used by the RFID reader, and
a normalized power level used by the RFID reader, and
wherein in the method the value of the environment variable is determined using calibration data, the value of the first measurable quantity, the value of the second measurable quantity, and the signal strength indicator.

Example 4

The method of example 1, wherein
the first measurable quantity is one of
the value ($f_{osc}$) of the frequency of a local oscillator,
the value (TRcal0') of the TRcal variable, at which a frequency jump occurs,
the height of the frequency jump ($\Delta f_{LF}$),
the value (NC') of the frequency parameter indicating the number of pulses of the local oscillator corresponding to the duration of a frequency-setting parameter,
the output (S') of a sensor; and
the second measurable quantity is a signal strength indicator, and the signal strength indicator is one of:
an indicator of the signal strength at the remote-access apparatus,
an RSSI parameter of the reader device,
a power used by the RFID reader to send a signal, and
a normalized power level used by the RFID reader.

Example 5

A method for determining the value of an environment variable (T') using raw data from a remote-access apparatus, the remote-access apparatus being energetically essentially passive, the method including:
obtaining a value ($f_{osc}$,TRcal0',$\Delta f_{LF}$,S',NC') of a measurable quantity from the raw data, the quantity being indicative of the environment variable, and the quantity being measured with a regulated signal strength, and
determining the value of the environment variable using calibration data and the value of the measurable quantity, wherein the calibration data includes information relating the value of the environment variable to value of the environment variable, the measurable quantity being measured with the regulated signal strength.

Example 6

The method of example 5 further including:
obtaining a value (TRcal0',$\Delta f_{LF}$,$f_{osc}$,$f_{LF}$,P') of a second measurable quantity, the second measurable quantity being indicative of the environment variable or the measurement conditions of the first measurable quantity, and the second measurable quantity being measured with a regulated signal strength, and determining the value of the environment variable using calibration data, the value of the first measurable quantity, and the value of the second measurable quantity.

Example 7

The method of any of the examples 1-6, wherein the raw data is measured from the remote-access apparatus.

Example 8

A method for calibrating a remote-access apparatus for measuring the value of an environment variable, said remote-access apparatus being energetically essentially passive, the method including:
measuring a value ($f_{osc}$,TRcal0',$\Delta f_{LF}$,S',NC') of a first measurable quantity indicative of an environment variable ($T'_i$) in measurement conditions,
measuring a value (TRcal0',$\Delta f_{LF}$,$f_{osc}$,$f_{LF}$,P') of a second measurable quantity, the second measurable quantity being indicative of the environment variable or the measurement conditions,
measuring a value of said environment variable ($T'_i$) corresponding to said measured value of a first measurable quantity and measurement conditions, and
forming calibration data for said remote-access apparatus using said value ($f_{osc}$,TRcal0', $\Delta f_{LF}$,NC') of a first measurable quantity, said value (TRcal0',$\Delta f_{LF}$,$f_{osc}$,$f_{LF}$,P') of a second measurable quantity, and said value (T of said environment variable.

Example 9

The method of example 8, wherein the calibration data includes at least one of:
(a) parameters of a function converting said value of a first measurable quantity and said value of a second measurable quantity to the value of the environment variable, such as parameters of a function h, wherein T'=h($f_{osc}$,P').
(b) parameters of a first function converting said value of a first measurable quantity to an initial value of the environment variable and parameters of a second function providing a correction term using the second measurable quantity, such as parameters of the function h and e, wherein T'=h($f_{osc}$)+e(P')
(c) parameters of a function converting said first value of a measurable quantity to a set of initial environment variables, and information indicative of means for determining the environment variable using the set of initial environment variables and the second measurable quantity, such as parameters of the functions Ti(TRcal0), wherein H={T1(TRcal0), T2(TRcal0), . . . , TN(TRcal0)}, and parameters of the function h, wherein $T'_0$=h($f_{osc}$), and the environment variable is determined using H and $T'_0$, and
(d) measured data points of the value of a first measurable quantity, the value of a second measurable quantity, and the value of the environment variable, such as ($f_{osc}$,TRcal0',T'), (S', P',T'), or ($f_{osc}$,P',T')

Example 10

The method of example 8 or 9, wherein
the value of the first measurable quantity is the value of the TRcal parameter, at which a frequency jump occurs (TRcal0'), and
the value of the second measurable quantity is one of: the value of the frequency of a local oscillator ($f_{osc}$) the value of the backscattering frequency ($f_{LF}$), and the value of the height of the frequency jump ($\Delta f_{LF}$).

Example 11

The method of example 10 further including measuring a value (P') of a signal strength indicator, wherein the signal strength indicator is one of:
an indicator of the signal strength at the remote-access apparatus,
an RSSI parameter of the reader device,
a power used by the RFID reader to send a signal, and
a normalized level used by the RFID reader; and
wherein in the method calibration data for said remote-access apparatus is formed using said value of a first measurable quantity (TRcal0'), said value of a second measurable quantity ($f_{osc}, f_{LF}, \Delta f_{LF}$), said value of the signal strength indicator (P'), and said value ($T'_i$) of said environment variable.

Example 12

The method of example 8 or 9, wherein
the first measurable quantity is one of
the value ($f_{osc}$) of frequency of a local oscillator,
the value (TRcal0') of the TRcal variable, at which a frequency jump occurs,
the height of the frequency jump ($\Delta f_{LF}$),
the value (NC') of the frequency parameter indicating the number of pulses of the local oscillator corresponding to the duration of a frequency-setting parameter,
the output of a sensor (S'), and
the second measurable quantity is a signal strength indicator, and the signal strength indicator is one of:
an indicator of the signal strength at the remote-access apparatus,
an RSSI parameter of the reader device,
a power used by the RFID reader, and
a normalized level used by the RFID reader.

Example 13

A method for calibrating a remote-access apparatus for measuring the value of an environment variable, said remote-access apparatus being energetically essentially passive, the method including:
regulating the strength of a measuring signal,
measuring a value ($f_{osc}$,TRcal0',$\Delta f_{LF}$,S',NC') of a measurable quantity indicative of an environment variable ($T'_i$) using the regulated measuring signal,
measuring a value of said environment variable ($T'_i$) corresponding to said measured value of a measurable quantity, and
forming calibration data for said remote-access apparatus using said value ($f_{osc}$,TRcal0', $\Delta f_{LF}$,S',NC') of a measurable quantity and said value ($T'_i$) of said environment variable.

Example 14

The method of example 13, wherein the strength of the measuring signal is regulated by:
tuning the strength of the measuring signal sent by a reader device using information whether the remote-access apparatus is detected or not;
tuning the strength of the measuring signal sent by a reader device using information whether a signal strength level at the remote-access apparatus is exceeded or not;
tuning the strength of the measuring signal sent by a reader device using information on the strength of the signal received by the reader device sent by the remote-access apparatus in response to said signal sent by a reader device; or
regulating the operating voltage of the remote-access apparatus by a voltage regulator.

Example 15

The method of example 13 or 14 further including
measuring a value (TRcal0',$\Delta f_{LF}$,$f_{osc}$,$f_{LF}$,P') of a second measurable quantity, the second measurable quantity being indicative of the environment variable or the measurement conditions using the regulated measuring signal, and
forming calibration data for said remote-access apparatus using said value ($f_{osc}$,TRcal0', $\Delta f_{LF}$,S',NC') of a measurable quantity, said value (TRcal0',$\Delta f_{LF}$,$f_{osc}$,$f_{LF}$,P') of a second measurable quantity, and said value ($T'_i$) of said environment variable.

Example 16

The method of any of the examples 8-15 wherein the value ($f_{osc}$,TRcal0', $\Delta f_{LF}$,S',NC') of a first measurable quantity is measured in a life cycle environment.

Example 17

An RFID reader device for determining a value of an environment variable using an energetically essentially passive remote-access apparatus and a database of calibration data, configured to:
measure a value ($f_{osc}$,TRcal0',$\Delta f_{LF}$,S',NC') of a first measurable quantity with the remote-access apparatus in measurement conditions,
measure a value (TRcal0',$\Delta f_{LF}$,$f_{osc}$,$f_{LF}$,P') of a second measurable quantity with the remote-access apparatus, the second measurable quantity being indicative of the environment variable or the measurement conditions of the first measurable quantity,
access a database of calibration data,
receive calibration data of the remote-access apparatus, and
determine the value of an environment variable using the value of a first measurable quantity, the value of a second measurable quantity, and said calibration data.

Example 18

The RFID reader of example 17, wherein
(a)
the first measurable quantity is one of
the value ($f_{osc}$) of the frequency of a local oscillator,
the value (TRcal0') of the TRcal variable, at which a frequency jump occurs,
the height of the frequency jump ($\Delta f_{LF}$),
the value (NC') of the frequency parameter indicating the number of pulses of the local oscillator corresponding to the duration of a frequency-setting parameter, and
an output of a sensor (S'); and
the second measurable quantity is a signal strength indicator, and the signal strength indicator is one of
an indicator of the signal strength at the remote-access apparatus,
an RSSI parameter of the reader device,
a power used by the RFID reader, and
a normalized power level used by the RFID reader; or (b)
the first measurable quantity is the value (TRcal0') of the TRcal variable, at which a frequency jump occurs; and the second measurable quantity is one of a frequency of a local oscillator ($f_{osc}$), a backscattering frequency ($f_{LF}$), and a height of a frequency jump ($\Delta f_{LF}$).

Example 19

An RFID reader device for determining a value of an environment variable using an energetically essentially passive remote-access apparatus and a database of calibration data, configured to:
regulate the strength of a measuring signal,
measure a value ($f_{osc}$,TRcal0',$\Delta f_{LF}$,S',NC') of a measurable quantity with the remote-access apparatus using the regulated measuring signal,
access a database of calibration data,
receive calibration data of the remote-access apparatus, and
determine the value of an environment variable using the value of a measurable quantity and said calibration data.

Example 20

The RFID reader device of example 19, wherein the RFID reader device is configured to regulate the strength of a measuring signal by:
tuning the strength of the measuring signal sent by a reader device using information whether the remote-access apparatus is detected or not;
tuning the strength of the measuring signal sent by a reader device using information whether a signal strength level at the remote-access apparatus is exceeded or not; or
tuning the strength of the measuring signal sent by a reader device using information on the strength of the signal received by the reader device sent by the remote-access apparatus in response to said signal sent by a reader device.

Example 21

An RFID reader device for calibrating an energetically essentially passive remote-access apparatus, configured to:
measure a value ($f_{osc}$,TRcal0',$\Delta f_{LF}$,S',NC') of a first measurable quantity with the remote-access apparatus, the first measurable quantity being indicative of the environment variable,
determine a value (TRcal0',$\Delta f_{LF}$,$f_{osc}$,$f_{LF}$,P') of a second measurable quantity, the second measurable quantity being indicative of the environment variable or the measurement conditions of the first measurable quantity,
receive a reference value of an environment variable (T'), and
form calibration data using the value of a first measurable quantity, the value of a second measurable quantity, and the reference value of an environment variable.

Example 22

An RFID reader device for calibrating an energetically essentially passive remote-access apparatus, configured to:
regulate the strength of a measuring signal,
measure a value ($f_{osc}$,TRcal0',$\Delta f_{LF}$,S',NC') of a measurable quantity with the remote-access apparatus using the regulated measuring signal
receive a reference value of an environment variable (T'),
form calibration data using the value of a measurable quantity and the reference value of an environment variable.

Example 23

The RFID reader device of any of the examples 21 or 22, wherein
said environment variable is temperature, and
the RFID reader device is configured to receive the value of the temperature by measuring the value with one of: a temperature sensor such as a thermal image camera, a thermocouple, a thermometer for the ambient temperature, and a previously calibrated remote-access apparatus.

Example 24

An energetically essentially passive remote-access apparatus for determining the value of an environment variable including:
means for determining a value ($f_{osc}$,TRcal0',$\Delta f_{LF}$,S',NC') of a first measurable quantity indicative of the environment variable (T'),
means for sending information indicative of the value of a first measurable quantity,
means for determining a value (TRcal0',$\Delta f_{LF}$,$f_{osc}$,$f_{LF}$,P') of a second measurable quantity indicative of the environment variable or the signal strength,
means for sending information indicative of the value of a second measurable quantity,
memory for storing calibration information, and
calibration data for determining the environment variable using the value of a first measurable quantity and the value of a second measurable quantity.

Example 25

An energetically essentially passive remote-access apparatus for determining the value of an environment variable including:
means for determining a value ($f_{osc}$,TRcal0,$\Delta f_{LF}$,S',NC') of a first measurable quantity indicative of the environment variable (T'),
means for sending information indicative of the value of a first measurable quantity,
means for determining the strength of a measuring signal, and
means for sending information indicative of the strength of a measuring signal.

Example 26

An energetically essentially passive remote-access apparatus for determining the value of an environment variable including:
means for determining a value ($f_{osc}$,TRcal0,$\Delta f_{LF}$,S',NC') of a first measurable quantity indicative of the environment variable (T'),
means for sending information indicative of the value of a first measurable quantity, and
a voltage regulator configured to regulate the operating voltage of the remote access apparatus.

Example 27

The remote-access apparatus of example 26, wherein the voltage regulator is arranged to operate in two states:

in a first state, wherein the voltage regulator does not regulate the operating voltage, and consumes essentially no energy, and in a second state, wherein the voltage regulator regulates the operating voltage of the remote access apparatus.

Example 28

A database of calibration data for determining the value of an environment variable (T') using raw data from a remote-access apparatus, said remote-access apparatus being energetically essentially passive, the database including:

an identity of a remote-access apparatus, and in association with the identity, calibration data of the remote-access apparatus, wherein the calibration data includes information for determining the value of the environment variable using the values of at least two measurable quantities (TRcal0',$\Delta f_{LF}$,$f_{osc}$,P',S',$f_{LF}$,NC').

Example 29

The database of example 28, wherein
the database is divided to a first part and a second part,
the first part is stored to one of: the remote-access apparatus, another remote-access apparatus, an RFID reader device, a memory card, and an external server, and
the second part is stored to one of: the remote-access apparatus, another remote-access apparatus, an RFID reader device, a memory card, and an external server.

Example 30

A computer product including the database of example 28 or 29.

It is clear that the present invention is not limited solely to the above-presented embodiments, but it can be modified within the scope of the appended claims.

The invention claimed is:

1. A method for determining the value of an environment temperature using an RFID reader and a transceiver, the transceiver being configured to draw energy from a field of the RFID reader, the method comprising:

sending an interrogation signal comprising a value of a frequency setting parameter from the RFID reader to the transceiver;

obtaining a value of a first backscatter link frequency, the first backscatter link frequency being set by the transceiver;

varying a value of a frequency setting parameter with the RFID reader;

obtaining a value of a second backscatter link frequency, the second backscatter link frequency being set by the transceiver;

using the values of the first backscatter link frequency and the second backscatter link frequency to obtain a value of a first measurable quantity, the first measurable quantity being indicative of the environment temperature;

obtaining a value of a second measurable quantity, the second measurable quantity being a signal strength indicator indicative of the strength of the signal of the RFID reader; and determining the value of the environment temperature using calibration data, the value of the first measurable quantity, and the signal strength indicator.

2. A method for calibrating a transceiver for measuring the value of an environment temperature, said transceiver being configured to draw energy from a field of an RFID reader, the method comprising:

sending an interrogation signal comprising a value of a frequency setting parameter from the RFID reader to the transceiver;

obtaining a value of a first backscatter link frequency, the first backscatter link frequency being set by the transceiver at an environment temperature;

varying a value of a frequency setting parameter by the RFID reader;

obtaining a value of a second backscatter link frequency, the second backscatter link frequency being set by the transceiver at the environment temperature;

using the values of the first backscatter link frequency and the second backscatter link frequency to obtain a value of a first measurable quantity indicative of the environment temperature, measuring a value of a second measurable quantity, the second measurable quantity being a signal strength indicator indicative of the strength of the signal of the RFID reader;

measuring a value of said environment temperature; and forming calibration data for said transceiver using said value of a first measurable quantity, said value of a signal strength indicator, and said value of said environment temperature.

3. The method according to claim 2, wherein the calibration data comprises at least one of:

parameters of a function converting said value of the first measurable quantity and said value of the signal strength indicator to the value of the environment temperature, parameters of a first function converting said value of the first measurable quantity to an initial value of the environment temperature and parameters of a second function providing a correction term using the signal strength indicator, parameters of a function converting said first value of a measurable quantity to a set of initial environment temperatures, and information indicative of means for determining the environment temperature using the set of initial environment temperatures and the signal strength indicator, and measured data points of the value of the first measurable quantity, the value of the signal strength indicator, and the value of the environment temperature.

4. An RFID reader for determining a value of an environment temperature using a database of calibration data and a transceiver that is configured to draw energy from a field of the RFID reader, the RFID reader being configured to:

send a first interrogation signal comprising a first value of a frequency setting parameter to the transceiver;

obtain a value of a first backscatter link frequency, the first backscatter link frequency being set by the transceiver;

send a second interrogation signal comprising a second value of the frequency setting parameter to the transceiver;

obtain a value of a second backscatter link frequency, the second backscatter link frequency being set by the transceiver;

using the values of the first backscatter link frequency and the second backscatter link frequency to determine a value of a first measurable quantity, the first measurable quantity being indicative of the environment temperature;

measure a value of a second measurable quantity with the transceiver, the second measurable quantity being a signal strength indicative of the strength of the signal of the RFID reader;

access a database of calibration data, receive calibration data of the transceiver; and determine the value of an environment temperature using the value of the first measurable quantity, the value of the signal strength indicator, and said calibration data.

5. An RFID reader for calibrating a transceiver that is configured to draw energy from a field of the RFID reader, the RFID reader being configured to:

send a first interrogation signal comprising a first value of a frequency setting parameter to the transceiver;

obtain a value of a first backscatter link frequency, the first backscatter link frequency being set by the transceiver at an environment temperature;

send a second interrogation signal comprising a second value of the frequency setting parameter to the transceiver;

obtain a value of a second backscatter link frequency, the second backscatter link frequency being set by the transceiver at the environment temperature;

using the values of the first backscatter link frequency and the second backscatter link frequency to determine a value of a first measurable quantity, the first measurable quantity being indicative of the environment temperature;

determine a value of a second measurable quantity, the second measurable quantity being a signal strength indicator indicative of the strength of the signal of the RFID reader;

receive a reference value of the environment temperature; and form calibration data using the value of the first measurable quantity, the value of the signal strength indicator, and the reference value of the environment temperature.

6. The RFID reader device according to claim 5, wherein the RFID reader device is configured to receive the value of the temperature by measuring the value with one of: a temperature sensor such as a thermal image camera, a thermocouple, a thermometer for the ambient temperature, and a previously calibrated transceiver.

7. The method according to claim 1, wherein the first measurable quantity is a value of the frequency setting parameter at which a backscatter link frequency jump occurs.

8. The method according to claim 7, wherein the value of the environment temperature is determined using calibration data, the value of the frequency setting parameter at which a backscatter link frequency jump occurs, and the signal strength indicator.

9. The method according to claim 1, further comprising:

obtaining the value of the first backscatter link frequency as a response to an RFID reader signal using a first value of the frequency setting parameter;

obtaining the value of the second backscatter link frequency as a response to an RFID reader signal using a second value of the frequency setting parameter; and iteratively decreasing the difference between the first value of the frequency setting parameter and the second value of the frequency setting parameter to find out such a value of value of the frequency setting parameter, where a frequency jump occurs in the backscatter link frequency.

10. The method according to claim 1, wherein the first measurable quantity is the value of a frequency of a local oscillator of the transceiver.

11. The method according to claim 1, wherein the first measurable quantity is a value of indicating the number of pulses of a local oscillator of the transceiver corresponding to the duration of a frequency-setting parameter.

12. The method according to claim 2, wherein the first measurable quantity is such a value of the frequency setting parameter at which a backscatter link frequency jump Occurs.

13. The method according to claim 2, further comprising:

obtaining the value of the first backscatter link frequency as a response to an RFID reader signal using a first value of the frequency setting parameter;

obtaining the value of the second backscatter link frequency as a response to an RFID reader signal using a second value of the frequency setting parameter; and iteratively decreasing the difference between the first value of the frequency setting parameter and the second value of the frequency setting parameter to find out such a value of value of the frequency setting parameter, where a frequency jump occurs in the backscatter link frequency.

14. The method according to claim 2, wherein the first measurable quantity is the value of a frequency of a local oscillator of the transceiver.

15. The method according to claim 2, wherein the first measurable quantity is a value of indicating the number of pulses of a local oscillator of the transceiver corresponding to the duration of a frequency-setting parameter.

* * * * *